(12) United States Patent
Tang et al.

(10) Patent No.: US 12,140,489 B2
(45) Date of Patent: Nov. 12, 2024

(54) PRESSURE SENSOR WITH HIGH STABILITY

(71) Applicant: InvenSense, Inc., San Jose, CA (US)

(72) Inventors: Tsung Lin Tang, Kaohsiung (TW); Chung-Hsien Lin, Hsinchu (TW); Ting-Yuan Liu, Zhubei (TW); Weng Shen Su, Hsinchu (TW); Yaoching Wang, Zhubei (TW)

(73) Assignee: InvenSense, Inc., San Jose, CA (US)

( * ) Notice: Subject to any disclaimer, the term of this patent is extended or adjusted under 35 U.S.C. 154(b) by 296 days.

(21) Appl. No.: 17/899,395

(22) Filed: Aug. 30, 2022

(65) Prior Publication Data

US 2023/0088319 A1  Mar. 23, 2023

Related U.S. Application Data

(60) Provisional application No. 63/246,683, filed on Sep. 21, 2021.

(51) Int. Cl.
*G01L 9/12* (2006.01)
*G01L 9/00* (2006.01)

(52) U.S. Cl.
CPC .............. *G01L 9/0073* (2013.01); *G01L 9/12* (2013.01)

(58) Field of Classification Search
CPC ................. G01L 9/0073; G01L 9/12
See application file for complete search history.

(56) References Cited

U.S. PATENT DOCUMENTS

| | | | | |
|---|---|---|---|---|
| 5,955,659 | A * | 9/1999 | Gupta | G01N 11/00 361/283.4 |
| 6,109,113 | A * | 8/2000 | Chavan | G01L 9/0073 73/706 |
| 6,352,874 | B1 * | 3/2002 | McNeil | G01L 9/0073 438/251 |
| 6,388,299 | B1 | 5/2002 | Kang et al. | |
| 6,945,115 | B1 * | 9/2005 | Wang | G01L 9/0073 73/718 |
| 11,027,967 | B2 * | 6/2021 | Lin | G01L 9/0045 |
| 11,885,705 | B2 * | 1/2024 | Kollias | G01L 9/125 |
| 2002/0157475 | A1 | 10/2002 | Onose et al. | |
| 2003/0015040 | A1 * | 1/2003 | Ishio | G01L 9/0042 73/718 |
| 2003/0019299 | A1 * | 1/2003 | Horie | G01L 9/0073 73/718 |
| 2003/0215974 | A1 | 11/2003 | Kawasaki et al. | |
| 2004/0020303 | A1 * | 2/2004 | Blomberg | G01L 9/0073 73/718 |
| 2004/0232503 | A1 * | 11/2004 | Sato | G01L 9/0042 257/417 |

(Continued)

*Primary Examiner* — David J Bolduc

(57) ABSTRACT

A pressure sensor comprises a polysilicon sensing membrane. The pressure sensor further includes one or more polysilicon electrodes disposed over a silicon substrate. The sensor also includes one or more polysilicon routing layers that electrically connects electrodes of the one or more polysilicon electrodes to one another, wherein the polysilicon sensing membrane deforms responsive to a stimuli and changes a capacitance between the polysilicon sensing membrane and the one or more polysilicon electrodes. The sensor also includes one or more vacuum cavities positioned between the polysilicon sensing membrane and the one or more polysilicon electrodes.

15 Claims, 29 Drawing Sheets

(56) References Cited

U.S. PATENT DOCUMENTS

| | | |
|---|---|---|
| 2005/0029607 A1 | 2/2005 | Fischer et al. |
| 2005/0132814 A1* | 6/2005 | Satou .................. B81C 1/00293 |
| | | 73/715 |
| 2010/0050776 A1* | 3/2010 | Fuhrmann ............. G01L 9/0073 |
| | | 73/718 |
| 2011/0140215 A1* | 6/2011 | Sato ...................... G01L 9/0042 |
| | | 257/419 |
| 2013/0020718 A1 | 1/2013 | Chou |
| 2013/0334620 A1 | 12/2013 | Chu et al. |
| 2014/0103461 A1 | 4/2014 | Chu et al. |
| 2016/0060103 A1 | 3/2016 | Hung et al. |
| 2016/0297673 A1* | 10/2016 | Lagouge ............. G01P 15/0802 |
| 2016/0305835 A1* | 10/2016 | Kollias ..................... G01L 9/12 |
| 2017/0081173 A1 | 3/2017 | Liu et al. |
| 2017/0339494 A1 | 11/2017 | Perletti et al. |
| 2017/0341928 A1 | 11/2017 | Liu et al. |
| 2020/0096336 A1 | 3/2020 | Cook et al. |
| 2020/0131028 A1 | 4/2020 | Cheng et al. |
| 2021/0354981 A1* | 11/2021 | Hermes ............... B81C 99/0045 |
| 2021/0403315 A1* | 12/2021 | Artmann ................. B81B 3/007 |
| 2023/0064114 A1* | 3/2023 | Ferrari ................ B81C 1/00476 |

* cited by examiner

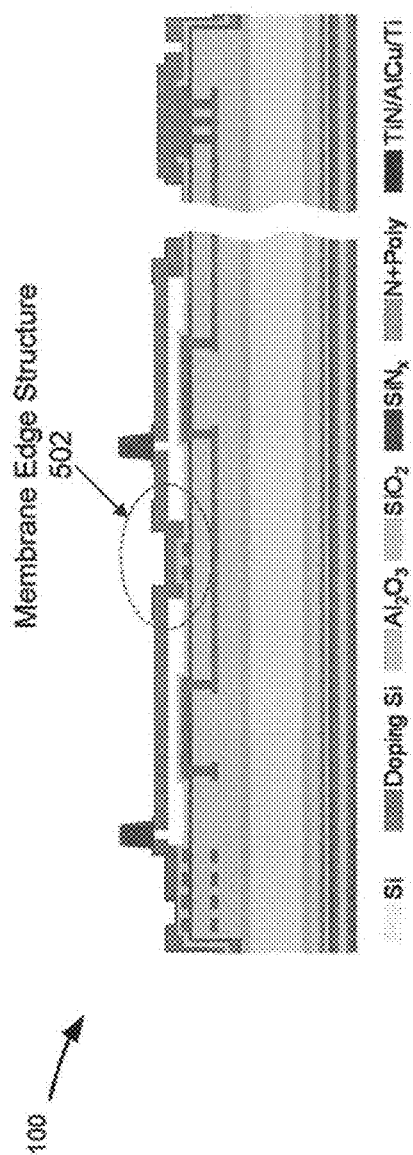
Figure 5A
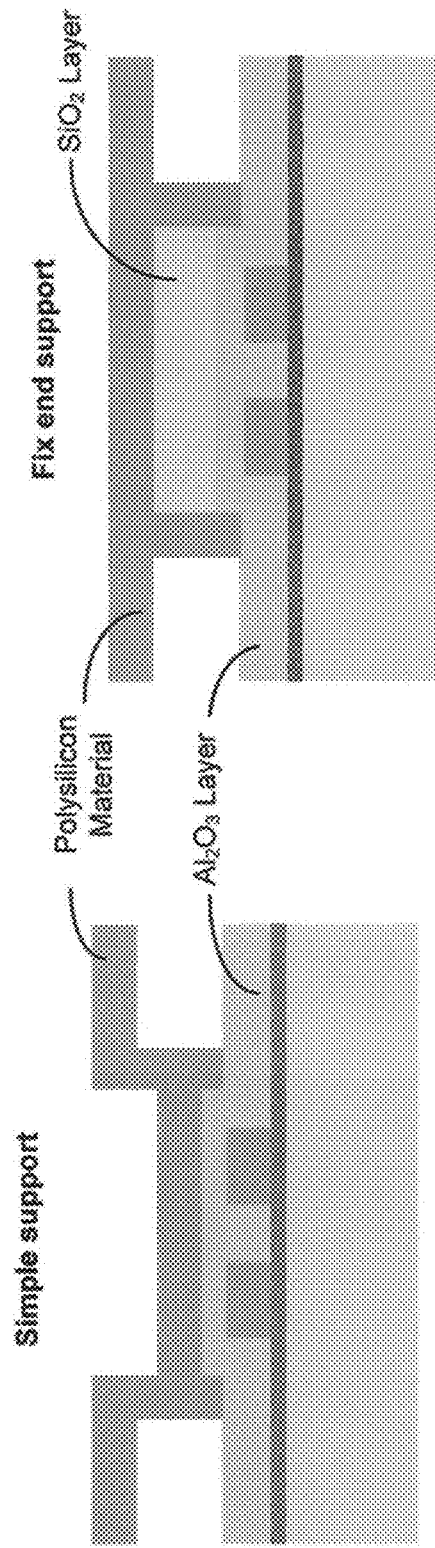
Figure 5B
Figure 5C

PRESSURE SENSOR WITH HIGH STABILITY

RELATED APPLICATIONS

The instant application is a non-provisional application and claims the benefit and priority to a provisional application No. 63/246,683 that was filed on Sep. 21, 2021, which is incorporated herein in its entirety.

BACKGROUND

Stability is important for a high-performance pressure sensor, especially for mobile phone applications. High-performance pressure sensor may be used in extreme environments, e.g., extreme temperatures. The temperature coefficient (TCO) and mechanical stability is important for the high-performance pressure sensor. If the pressure sensor is not stable, it may provide wrong signal output during, for example, snowing or jogging.

Die size of pressure sensors have traditionally been large due to a large area that is required for the membrane of the pressure sensor. Unfortunately, temperature performance such as TCO becomes worst due to the large area of metal being used. Moreover, the metal layers also limit the annealing temperature to bake out gas from the cavity. Furthermore, G-sensitivity, which is sensitivity to gravity, e.g., a change in frequency resulting from an acceleration force applied to pressure sensor, is high because of the thickness of membrane, thereby adversely impacting performance.

SUMMARY

Accordingly, a need has arisen for a new pressure sensor design, e.g., sensing membrane and electrodes, with high environment stability. Using polysilicon to form the sensing membrane, as well as electrode and routing, provides better TCO matching and higher thermal budget by using fewer metal layers, as an example. It is appreciated that in some embodiments, fewer metal layers, e.g., only one metal layer, are kept in the end of process for pad connection, thereby decreasing the amount of metal layer usage. Moreover, using polysilicon instead of metal for the electrode achieves higher annealing because polysilicon does not melt unlike metal. Melting of metal may result in disposition of the electrodes or the routing and may be known as a hillock effect. Use of polysilicon reduced hillock effect. In addition, polysilicon membrane is thin and small in size, thus providing better mechanical stability to prevent membrane stiction as well as reducing gravity sensitivity. In some embodiments, sensor performance is further improved by building a membrane array.

A pressure sensor comprises a polysilicon sensing membrane; one or more polysilicon electrodes disposed over a silicon substrate; one or more polysilicon routing layers that electrically connects electrodes of the one or more polysilicon electrodes to one another, wherein the polysilicon sensing membrane deforms responsive to a stimuli and changes a capacitance between the polysilicon sensing membrane and the one or more polysilicon electrodes; and one or more vacuum cavities positioned between the polysilicon sensing membrane and the one or more polysilicon electrodes.

In some embodiments, the pressure sensor includes $Al_2O_3$ over poly electrode. It is appreciated that in some embodiments the polysilicon sensing membrane includes a sensing membrane array comprising a plurality of membrane cells separated by support structures. In some nonlimiting example each membrane cell of the plurality of membrane cells comprises a plurality of vent holes. It is appreciated that in some embodiments the plurality of vent holes improves gas release capability of the sensing membrane array. According to some embodiments the plurality of vent holes of one membrane cell is positioned inside a periphery of the one membrane cell, outside of a periphery of the one membrane cell, or on a periphery edge of the one membrane cell.

According to some embodiments the polysilicon sensing membrane includes multiple sensing membrane arrays that work independent from one another and improve a signal to noise ratio (SNR) of the pressure sensor. It is appreciated that in some embodiments the pressure sensor further includes an edge protection structure sealed by a sealing material to reduce gas penetration into the one or more vacuum cavities. In some embodiments, the sealing material includes one or more of a metal film, a semiconductor film, and a dielectric film comprising Silicon Nitride. It is appreciated that in some embodiments the pressure sensor further includes a membrane edge structure configured to improve anchor stability, wherein the membrane edge comprises polysilicon vertical support structure, over an insulator. In one nonlimiting example the pressure sensor further includes an $SiN_3$ layer over the polysilicon vertical support structure. According to some embodiments the support structure includes an oxide layer to reduce parasitic capacitance between the one or more polysilicon electrodes and the one or more polysilicon routing layers. The pressure sensor may further include an oxide layer surrounding the one or more polysilicon routing layers to reduce parasitic capacitance. It is appreciated that according to some embodiments, the one or more vacuum cavities is further sealed by a metal layer or a silicon nitride layer to reduce gas penetration into the one or more vacuum cavities. According to some embodiments the pressure sensor further includes a release protection layer configured to protect structure of the pressure sensor during a vapor hydrogen fluoride (VHF) release process. It is appreciated that according to one nonlimiting example the silicon substrate includes a via, wherein the via is positioned outside of the one or more vacuum cavities.

According to some embodiments, a method includes depositing a first isolation layer on a substrate; depositing and patterning a first polysilicon layer on the first isolation layer; depositing and patterning a second isolation layer on the first polysilicon layer; forming a plurality of vias; depositing and patterning a second polysilicon layer on the second isolation layer; depositing and patterning a gap oxide layer on the second polysilicon layer; depositing and patterning a membrane layer on the gap oxide layer; releasing the gap oxide layer as a sacrificial layer; and sealing one or more release holes on the membrane layer.

According to some embodiments, the one or more release holes on the membrane layer is sealed with either a metal layer or a dielectric film. In some embodiments, the method further includes depositing an $Al_2O_3$ layer over the second polysilicon layer before depositing the gap oxide layer. It is appreciated that in some embodiments the one or more release holes are positioned at an edge of the membrane layer, inside a periphery of the membrane layer, or outside of a periphery of the membrane layer. According to some embodiments the metal is one or more of TiN, AlCu, and Ti. According to some embodiments, releasing the gap oxide is through a vapor Hydrogen Flouride (VHF) release process. In some embodiments, releasing the gap oxide is through a buffered oxide etchant (BOE) release. According to some embodiments, the method further includes annealing the second polysilicon layer before sealing to improve vacuum stability. In yet some embodiments the method includes depositing and patterning a first silicon nitride (SiNx) layer on top of the second isolation layer. In yet another embodiment, the method further includes depositing and patterning a second $SiN_x$ layer on the second polysilicon layer. It is appreciated that the method may further include depositing and patterning $Al_2O_3$ on the second $SiN_x$ layer to protect the second polysilicon layer during the release process. In some nonlimiting examples, the method may further include depositing and patterning a nitride layer on top of the membrane layer for passivation. According to some embodiments, the method further includes creating one or more openings on the nitride layer to expose the second $SiN_x$.

These and other features and advantages will be apparent from a reading of the following detailed description.

BRIEF DESCRIPTION OF DRAWINGS

FIGS. 5A-5C show different membrane edge structures implemented to improve anchor stability of the pressure sensor according to one aspect of the present embodiments.

DESCRIPTION

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

Figure 1:
FIG. 1 shows an example of a new design of a pressure sensor to improve temperature coefficient and mechanical stability according to one aspect of the present embodiments.

FIG. 1 shows an example of a pressure sensor 100 to improve temperature coefficient and mechanical stability. Sensing membrane 102 and electrode 104 are two components for the pressure sensor 100. The pressure sensor 100 uses polysilicon (or poly) as the sensing membrane 102, the electrode 104, and routing/interconnect layer 106 in order to provide better TCO matching and higher thermal budget. As shown in FIG. 1, fewer metal layers, e.g., only one metal layer 108, are used for pad connection. Using polysilicon (in place of single crystal) for the sensing membrane 102 reduces size and thickness of the sensing membrane 102, thus providing better mechanical stability to reduce gravity sensitivity and further to prevent membrane stiction. In addition, using polysilicon instead of metal for the electrode 104 and the routing layer 106 achieves higher annealing because polysilicon does not melt whereas metal does, thereby reducing hillock effect.

The pressure sensor 100 achieves significant improvement in sensor performance and stability. For examples, the proposed design reduces coefficient of thermal expansion (CTE) mismatch for the electrode. The described embodiments also reduce the G-sensitivity and the chip size of the pressure sensor 100 (e.g., by 50%), while increasing 100 kPa sensitivity of the pressure sensor 100 (e.g., from 0.93 aF/Pa to 1.95 aF/Pa).

Figure 2:
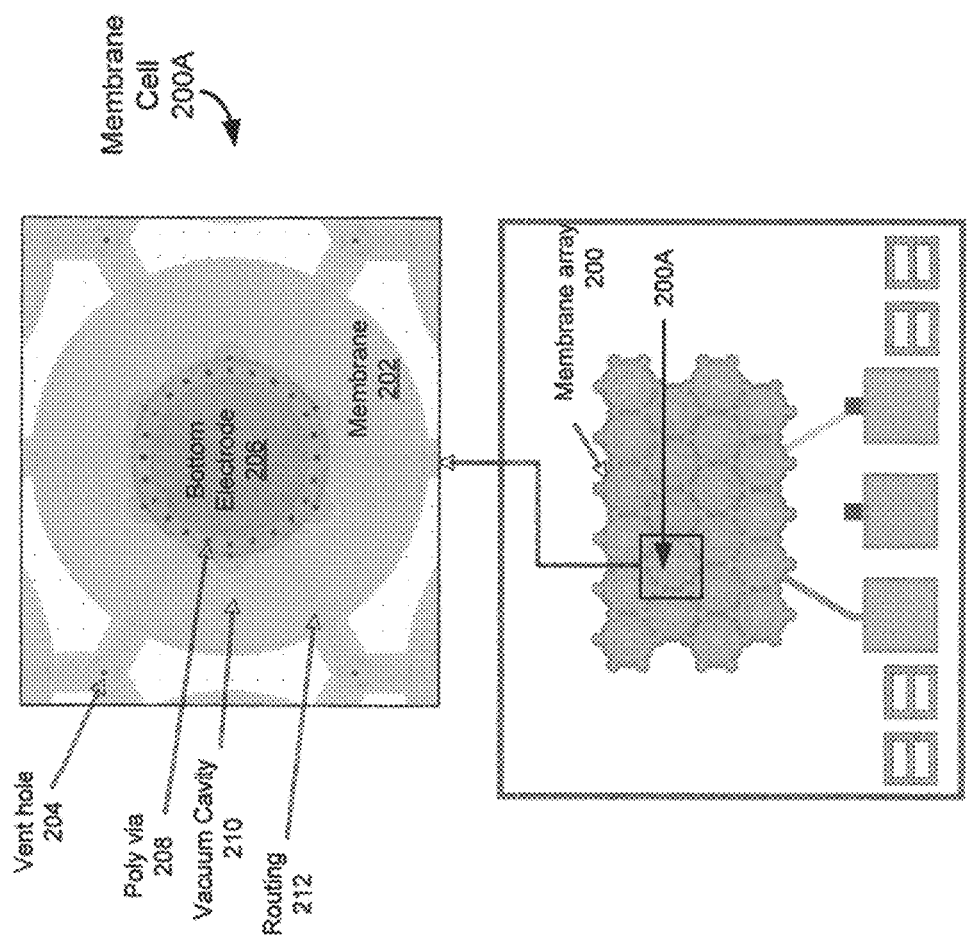
FIG. 2 shows an example of a membrane array in the pressure sensor according to one aspect of the present embodiments.

In some embodiments, performance of the pressure sensor 100 can be further improved by building a sensing membrane array 200 as shown by the example of FIG. 2. The membrane array 200 includes a plurality of membrane cells 200A of sensing elements, wherein increasing the number of sensing elements can improve sensitivity of the pressure sensor 100 to meet the different applications. It is appreciated that each membrane cell 200A includes a membrane 202 that is positioned over a bottom electrode 206, e.g., similar to electrode 104. In some embodiments, at least one or more of the membrane cells 200A further includes at least a plurality of vent holes 204s, a plurality of polysilicon vias 208s, and one or more routings 212s, e.g., similar to routing layer 106. In some embodiments, the vent holes are used to vent out gas from the cavity of the sensor. In some nonlimiting examples, the polysilicon vias are used to make electrical connection between different areas of the sensor and the routings are used to electrically connect the bottom electrodes of the membrane cells to one another. It is appreciated that each membrane cell 200A includes a vacuum cavity 210 that is positioned between the membrane 202 and the bottom electrode 206. It is appreciated that the membrane cells 200A once connected via the routing 212, form the membrane 102 that is connected via the routing layer 106.

Figure 3:
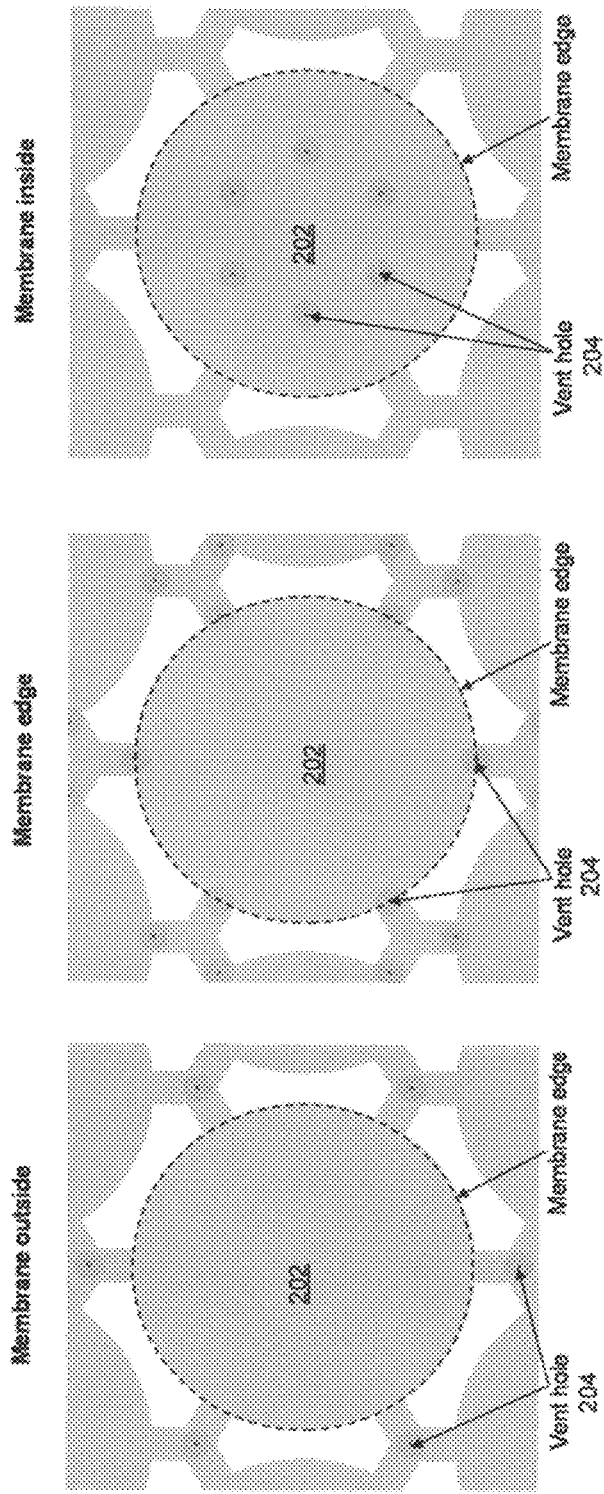
FIG. 3 depicts examples of a plurality of vent holes located either outside of, on an edge/radius of, or inside a membrane array cell according to one aspect of the present embodiments.

In some embodiments, the plurality of vent holes 204s are positioned at different locations of each membrane 202 to improve gas release capability of the membrane cell 200A. FIG. 3 depicts examples of the plurality of vent holes 204s located either outside of the membrane 202 periphery, right on an edge/radius of the sensing membrane 202, or inside the membrane 202 periphery. In some embodiments, the plurality of vent holes 204s can be located at a combination of one or more of inside, on the edge of, and outside of the membrane 202 in one design depending on the process capability.

Figure 4:
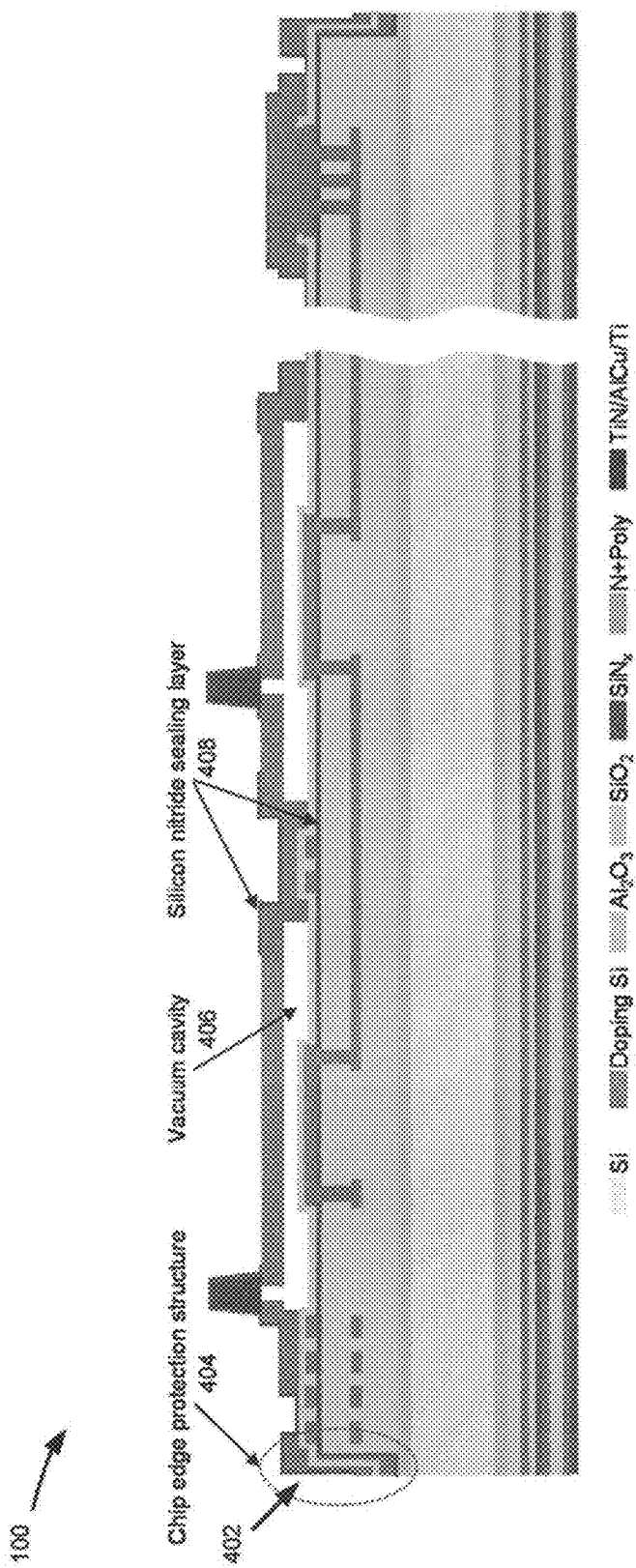
FIG. 4 depicts examples of different sealing materials selected and used at different locations of the pressure sensor according to one aspect of the present embodiments.

In some embodiments, different sealing materials 402s can be selected and used at different locations of the pressure sensor 100 to improve the vacuum stability of the pressure sensor 100, as shown by the example of FIG. 4. For example, sealing material 402 can be applied at a chip edge protection structure/ring 404 to prevent gas from penetrating cavity sidewall. Here, the sealing material 402 can be either a single layer material or a multi-layer material. In some embodiments, the sealing material 402 may combine different kinds of materials for different process capabilities. It is appreciated that different kinds of materials include but are not limited to, a metal film, e.g., TiN, AlCu and Ti, a semiconductor film, e.g., a polysilicon film or Si migration technique, and/or a dielectric film, e.g., SiNx and $SiO_2$. The structures of the pressure sensor 100 sealed with the sealing material 402 improves hermeticity of one or more vacuum cavities and/or channels 406s, which connect the plurality of membrane cells 200A in the membrane array 200. In some embodiments, a silicon nitride sealing layer 408 may also be deposited to reduce the gas penetration into the vacuum cavity 406 area from the top and also deposited at the bottom surfaces of vacuum cavities 406s to reduce gas penetration into the vacuum cavity 406 from the bottom. According to some embodiments, the sealing material 402, the silicon nitride sealing layer 408, or a combination of the sealing material 402 and the silicon nitride sealing layer 408 may be used.

In some embodiments, different membrane edge structures 502 can be implemented to improve anchor stability of the pressure sensor 100 that includes gyro and accelerometer, as shown by the examples of FIGS. 5A-5C. A simple support structure, as illustrated in FIG. 5B, shows the support that includes a polysilicon material disposed on a layer of $Al_2O_3$ layer whereas in FIG. 5C, the polysilicon material of the support is disposed directly on a $SiO_2$ layer which is directly disposed on the $Al_2O_3$ layer, as shown in FIG. 5C.

Figure 6:
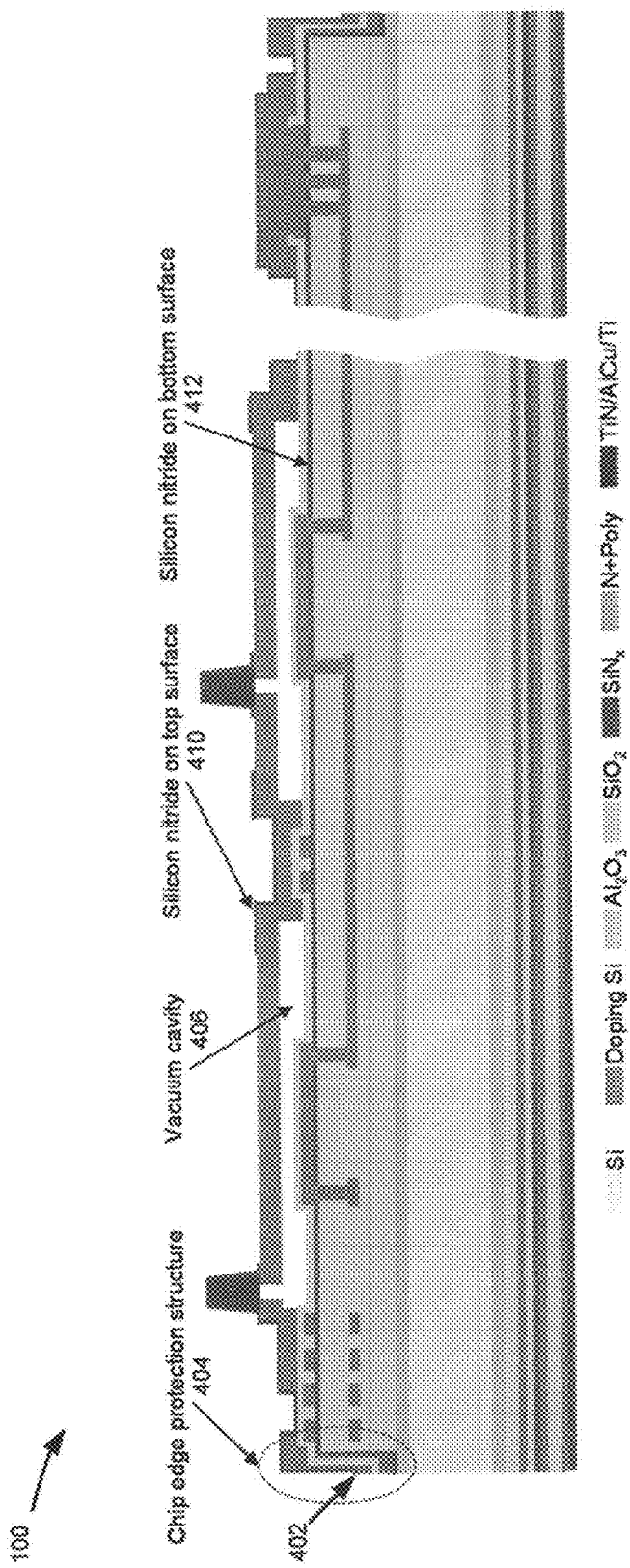
FIG. 6 shows examples of vacuum cavity of the pressure sensor sealed to further improve hermicity of the vacuum cavity achieve helium proof according to one aspect of the present embodiments.

In some embodiments, the vacuum cavities 406s of the pressure sensor 100 are sealed using an SiN layer to further improve hermicity of the vacuum cavity as shown by the example of FIG. 6. As shown in FIG. 6, silicon nitride and/or metal are used to seal the top surface 410 of the anchor region and further to seal the vent holes 204s. A silicon nitride layer 412 may also be deposited at a bottom of the cavity to prevent the outgassing from bottom surface of the cavity. In some embodiments, the chip edge protection structure 404 is configured to block sidewall gas penetration path into the pressure sensor 100.

Figure 7:
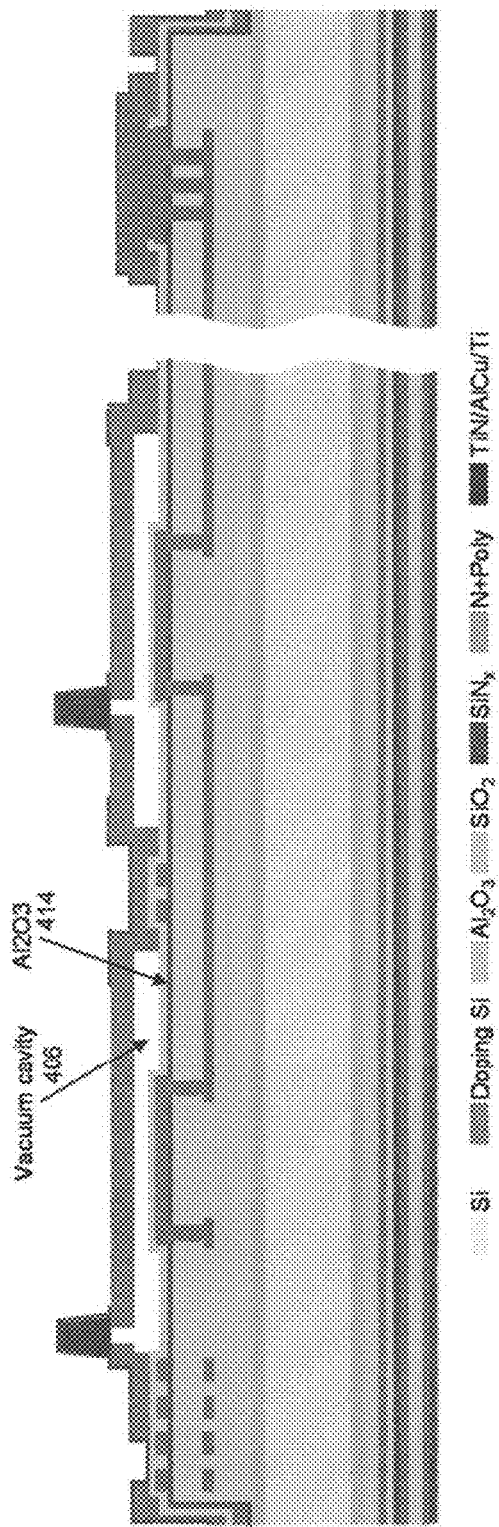
FIG. 7 shows an example of a release protection layer implemented in the pressure sensor according to one aspect of the present embodiments.

In some embodiments, a release protection layer 414, e.g., an $Al_2O_3$ layer, is deposited over the Silicon Nitride layer 412 that covers the bottom surface of the cavity in the pressure sensor 100 as shown by the example of FIG. 7. The release protection layer 414 protects structure of the pressure sensor 100 during a vapor hydrofluoric acid (VHF) release process for better etching selectivity. In some embodiments, the vent holes 204s are placed at different locations, e.g., inside the radius of the sensing membrane array cell 200A to reduce the release distance and time of the pressure sensor 100, as shown by the example in FIG. 3.

Figure 8:
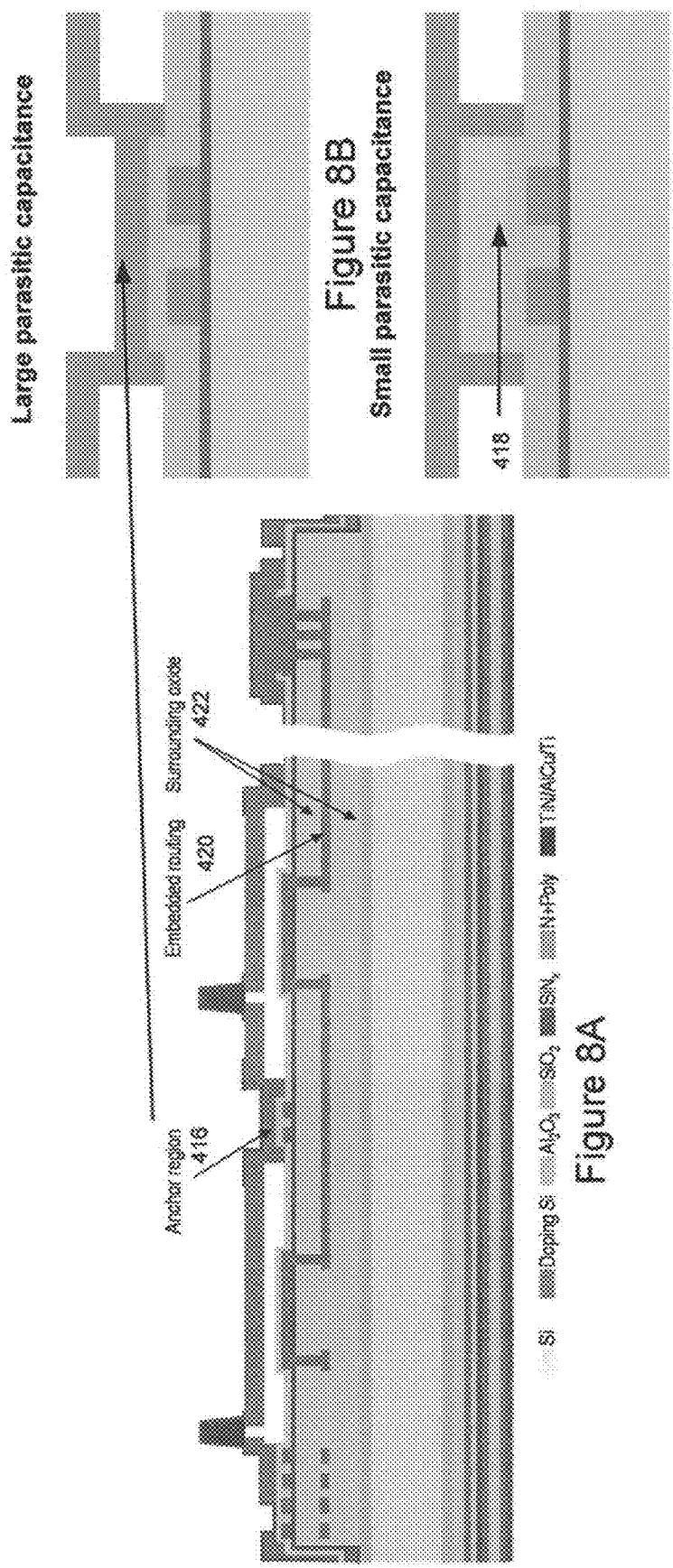
FIGS. 8A-8C show implementations of an example of a membrane anchor region in the pressure sensor according to one aspect of the present embodiments.

A membrane anchor region 416 in the pressure sensor 100 as shown in the example of FIG. 8A and zoomed in view in FIG. 8B may cause large parasitic capacitance that degrades performance of the pressure sensor 100. In some embodiments, an oxide spacer 418 may be added at the membrane anchor region 416 to reduce the parasitic capacitance between the bottom electrode and its routing (input node) as shown by the example of FIG. 8C. In some embodiments, surrounding oxide 422 around embedded routing 420 in the pressure sensor 100 also reduces the parasitic capacitance.

Figure 9:
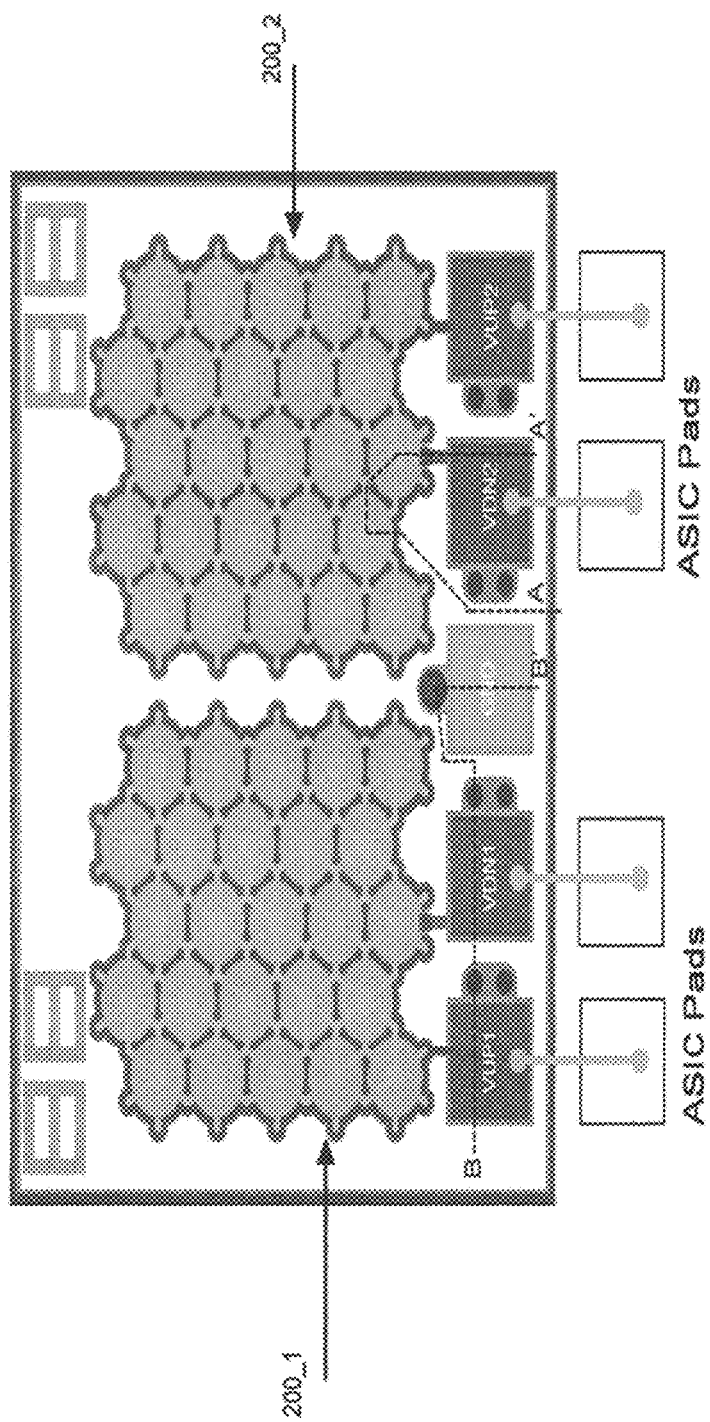
FIG. 9 shows an example of multiple membrane arrays implemented in the pressure sensor according to one aspect of the present embodiments.

In some embodiments, multiple sensing membrane arrays (e.g., 200_1, 200_2) are implemented in the pressure sensor 100 to improve signal noise ratio (SNR) of the pressure sensor 100 as shown by the example of FIG. 9. Here, each of the membrane arrays 200s works independently of the other membrane arrays 200, thereby achieving a higher SNR in comparison to a single-ended design. Such dual sensing membrane design results in balanced parasitic capacitance at input of pressure sensor 100, which reduces noise from input of common mode feedback (CMFB). As such, the multiple membrane arrays 200s achieves considerably lower (e.g., up to 30%) noise for same sensor sensitivity.

Figure 10:
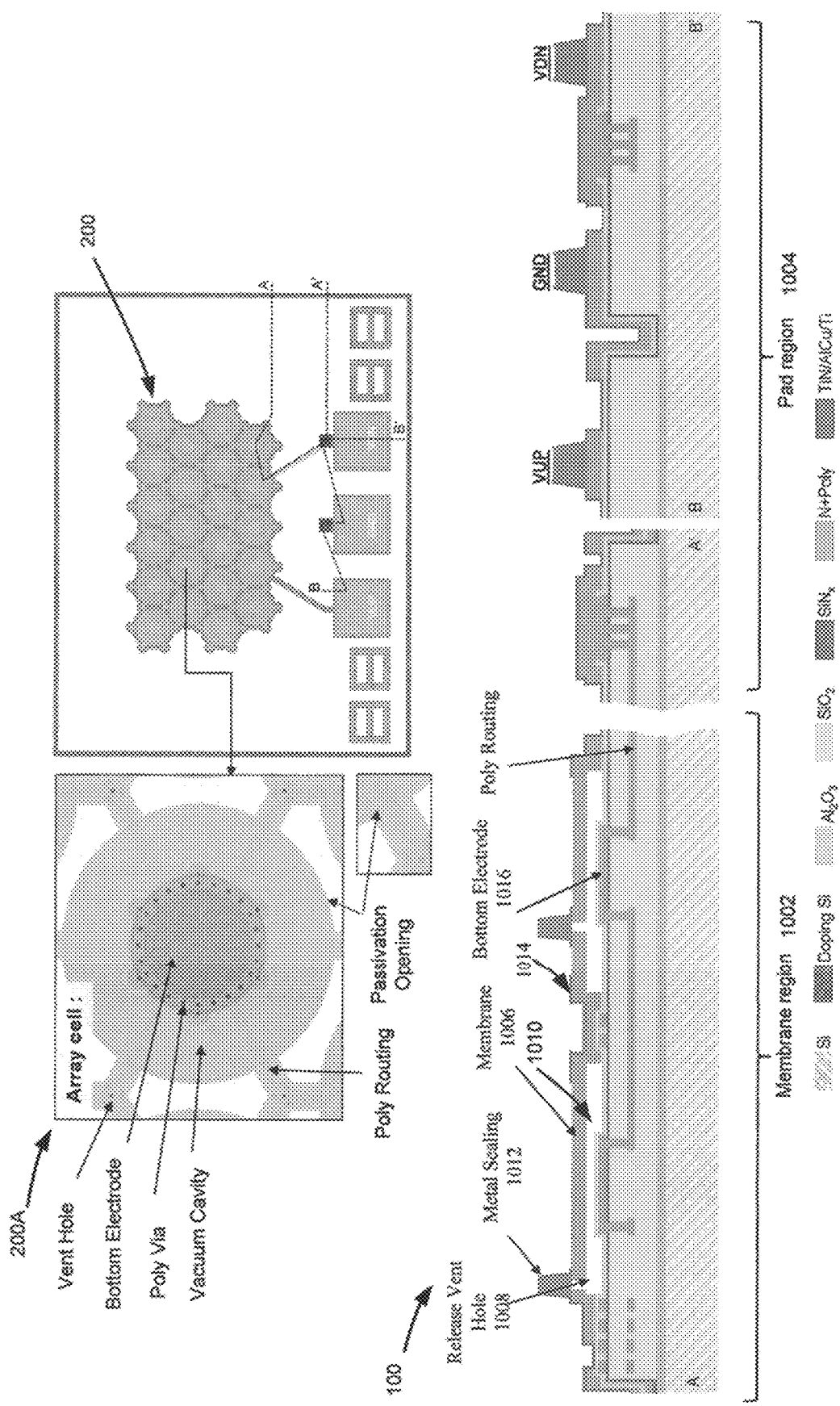
FIG. 10 shows an example of the pressure sensor according to one aspect of the present embodiments.

FIG. 10 depicts an example of the pressure sensor 100 described above, wherein the pressure sensor 100 is separated into a membrane region 1002 over the sensing membrane array 200 and pad region 1004 over the input and output pads as defined by cutlines A-A' and B-B' through the pressure sensor 100, respectively. As shown by the example of FIG. 10, the sensing membrane array 200 has 22 membrane array cells 200A. The membrane 1006 is made of polysilicon and can be, for non-limiting examples, less than 1 μm (e.g., 0.6 μm) in thickness, smaller than 100 μm in diameter, and 0.25 μm in sensing gap. The release vent hole 1008 is located at the edge of the membrane 1006, for illustration purposes, and the vacuum cavity 1010 is sealed by metal 1012, e.g., TiN/AlCu/Ti. A nitride layer 1014 may be used to protect the membrane/top electrode 1006 and an $Al_2O_3$ layer may also be added to protect the bottom electrode 1016 during the VHF or a buffered oxide etchant (BOE) release. It is appreciated that the nitride layer 1014 may be removed from the membrane/top electrode 1006 after the VHF or BOE release.

Figure 11A:
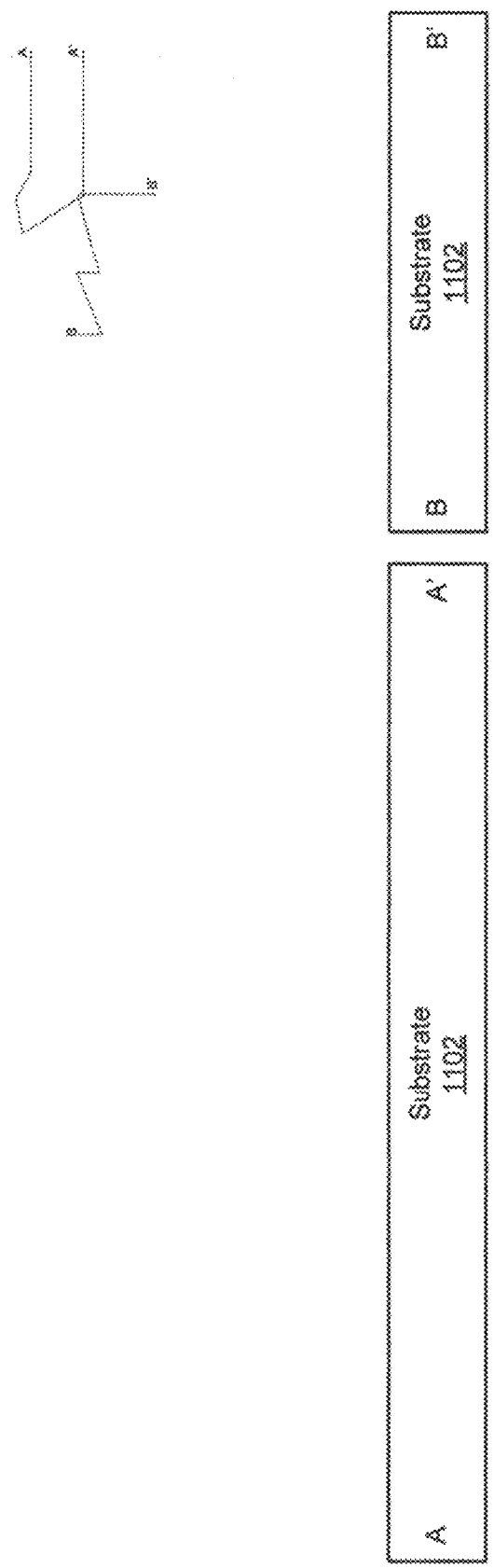
FIGS. 11A-11R illustrate an example of a detailed process for manufacturing the pressure sensor depicted in FIG. 10 according to one aspect of the present embodiments.
Figure 11B:
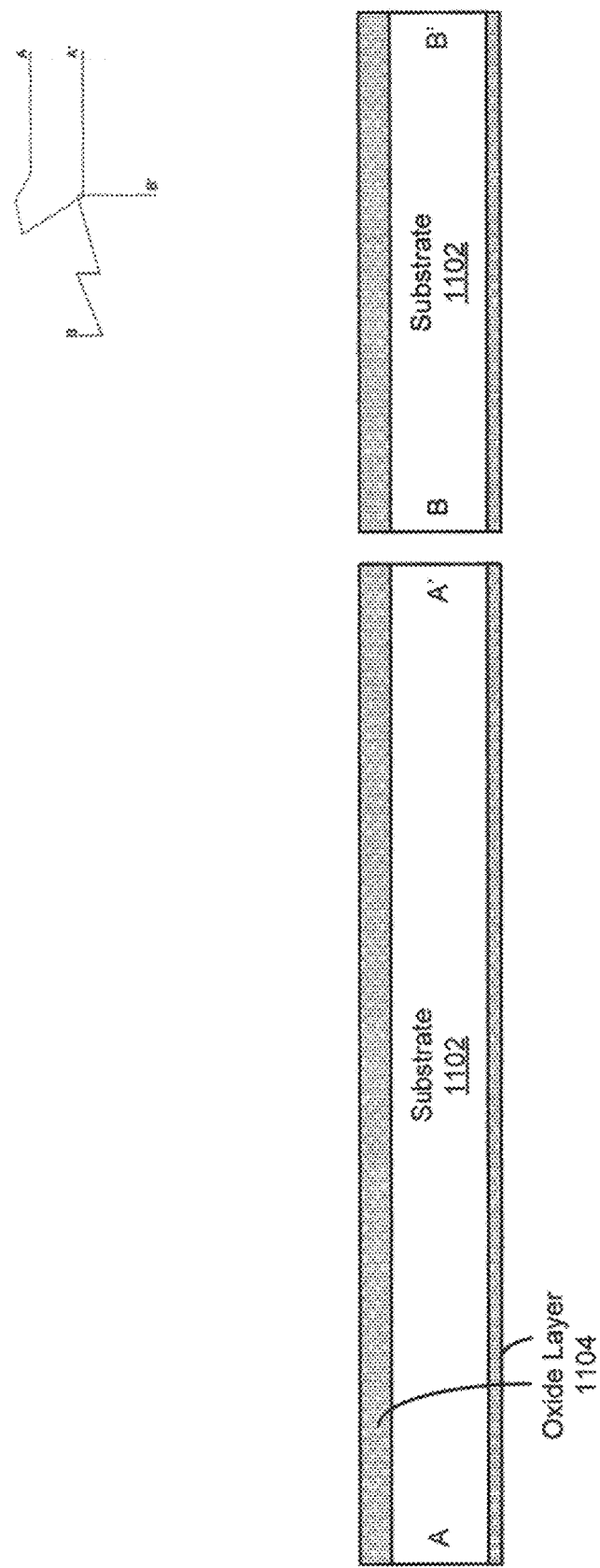
Figure 11C:
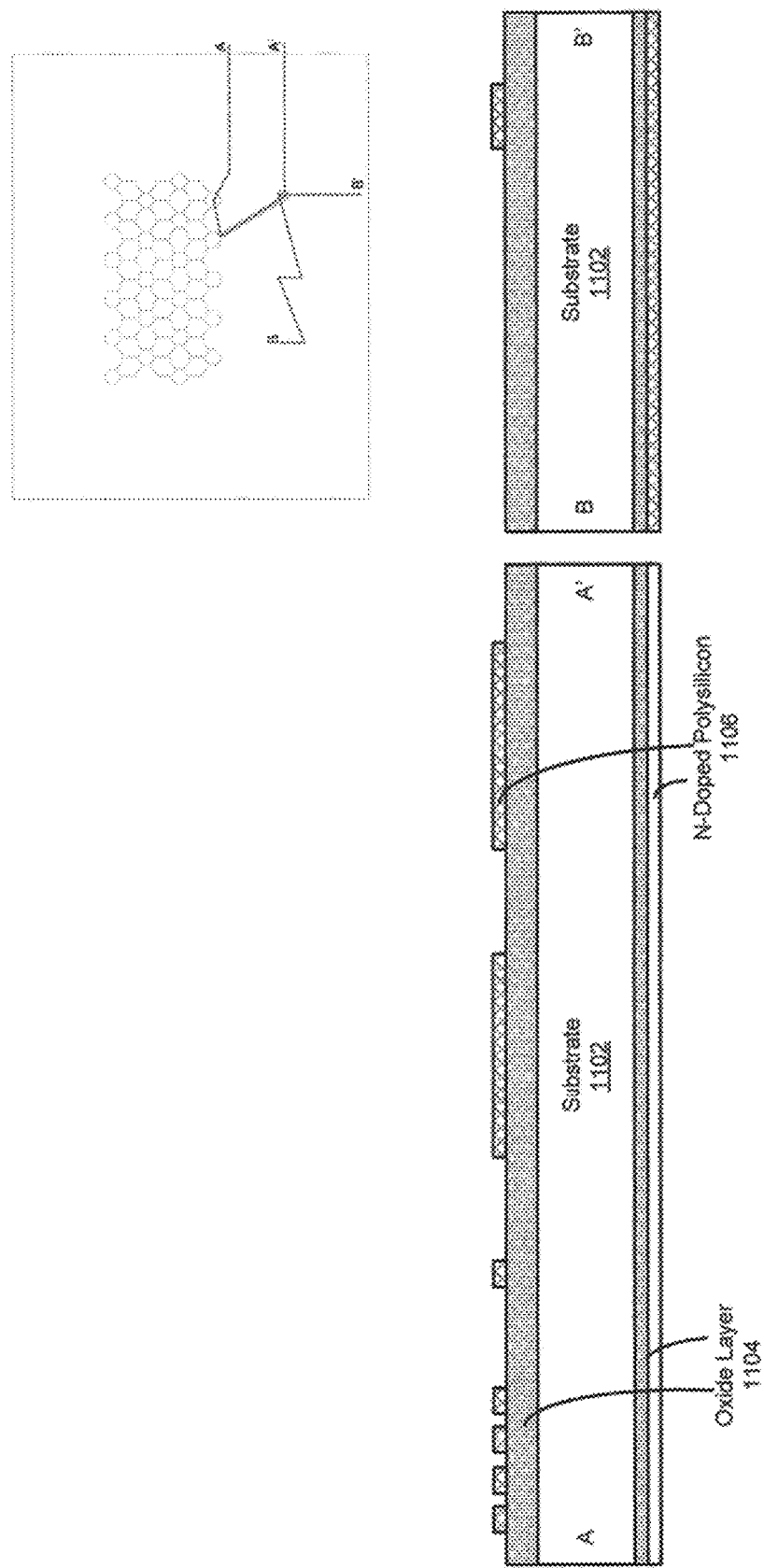
Figure 11D:
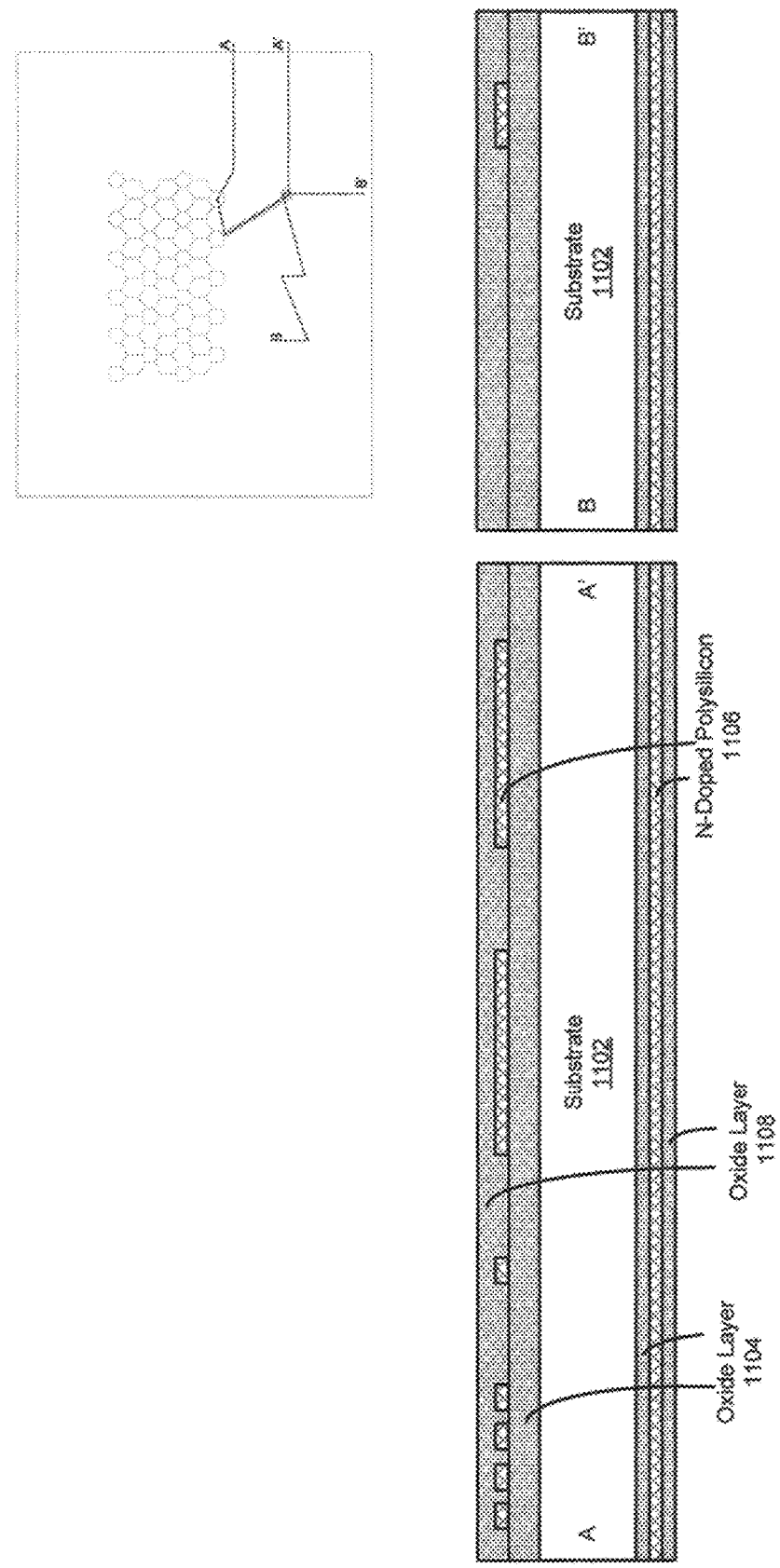
Figure 11E:
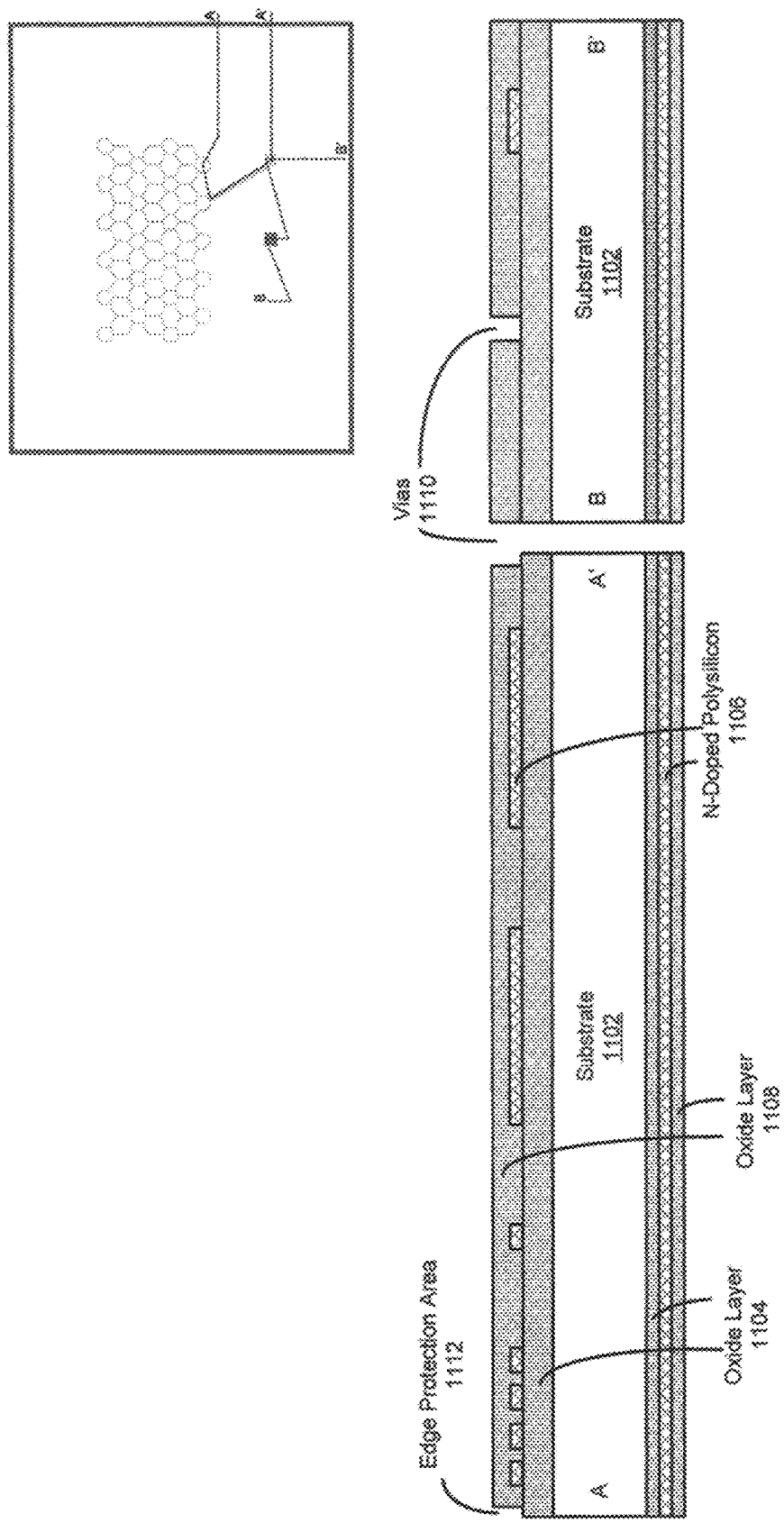
Figure 11F:
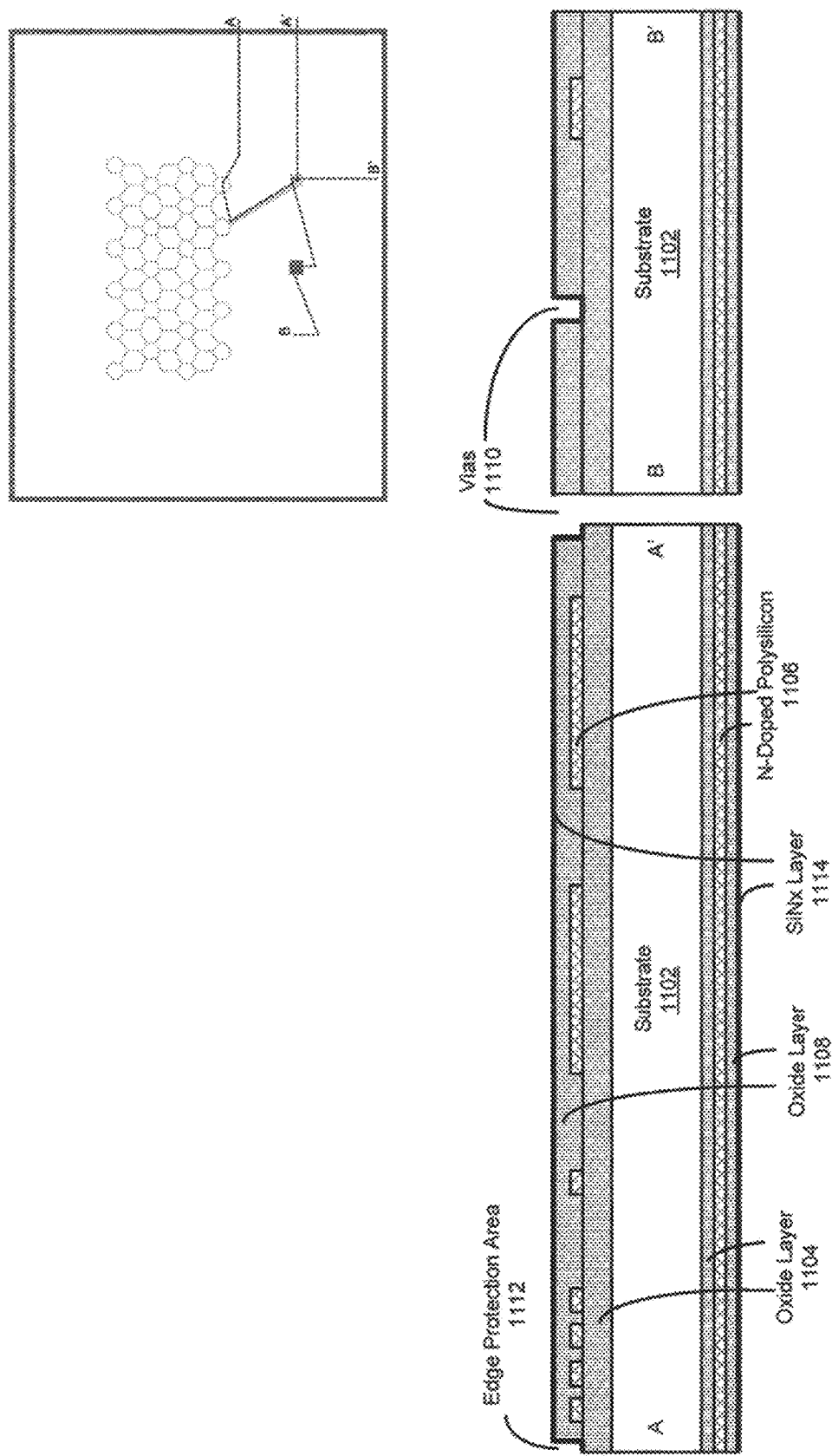
Figure 11G:
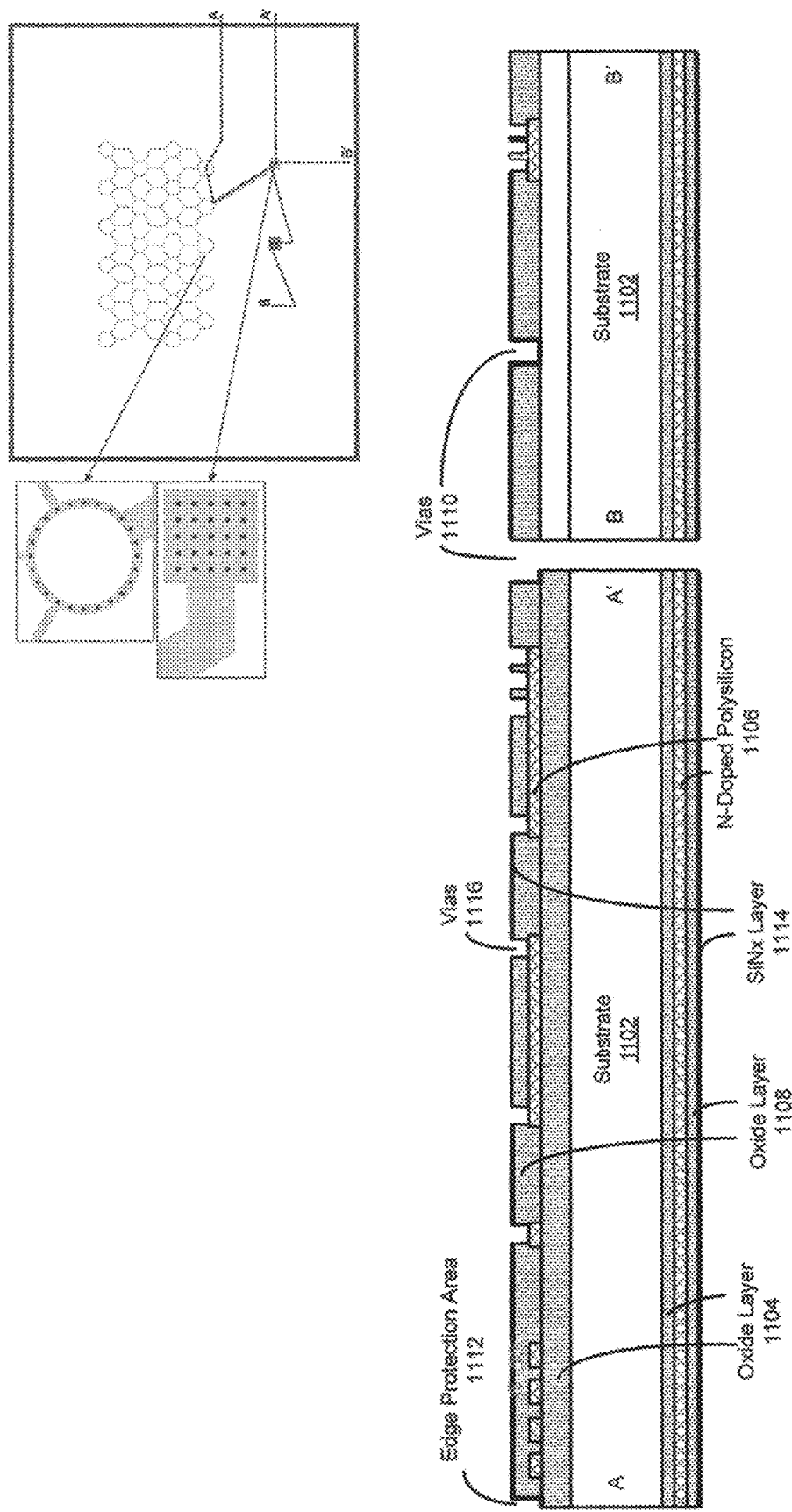
Figure 11H:
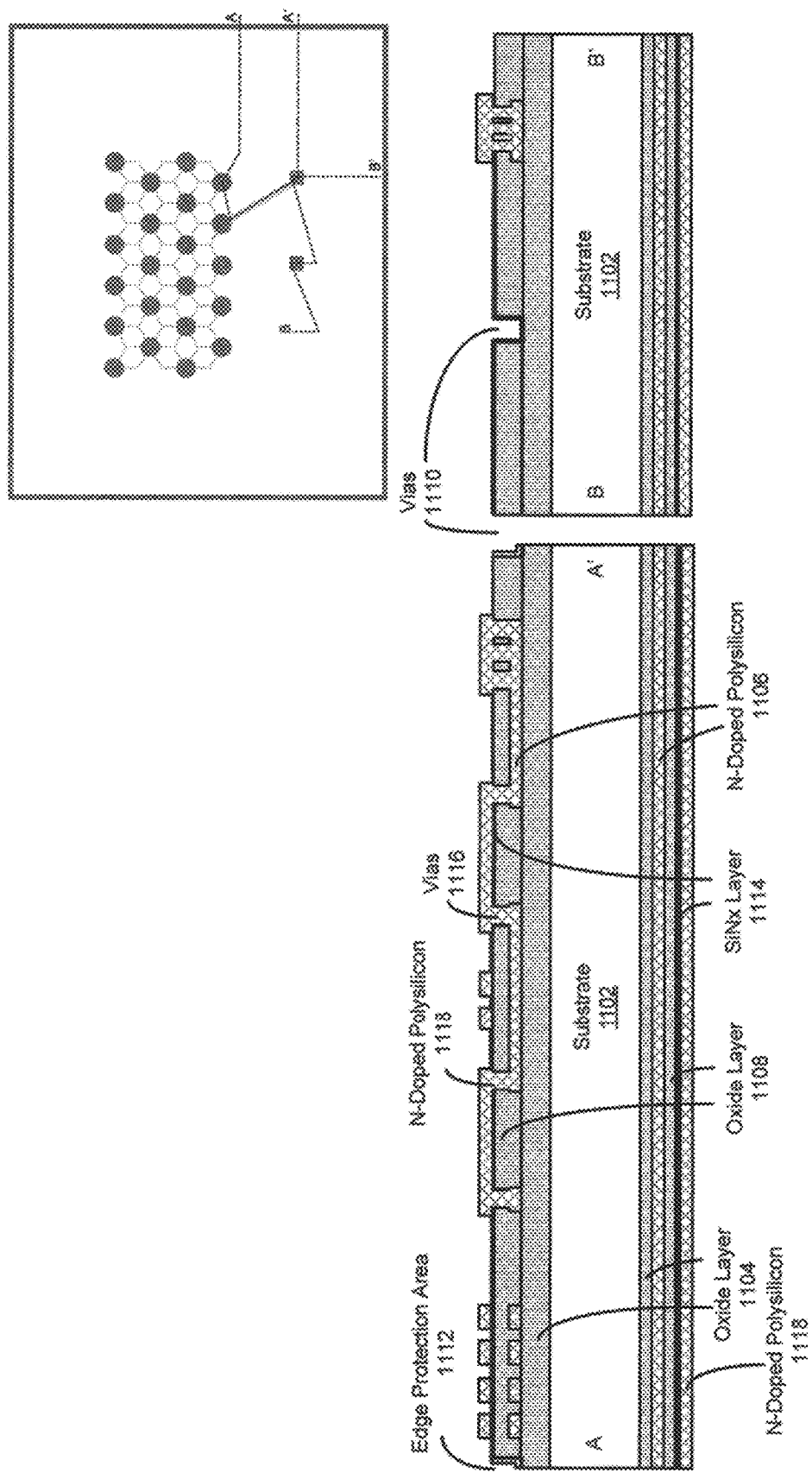
Figure 11I:
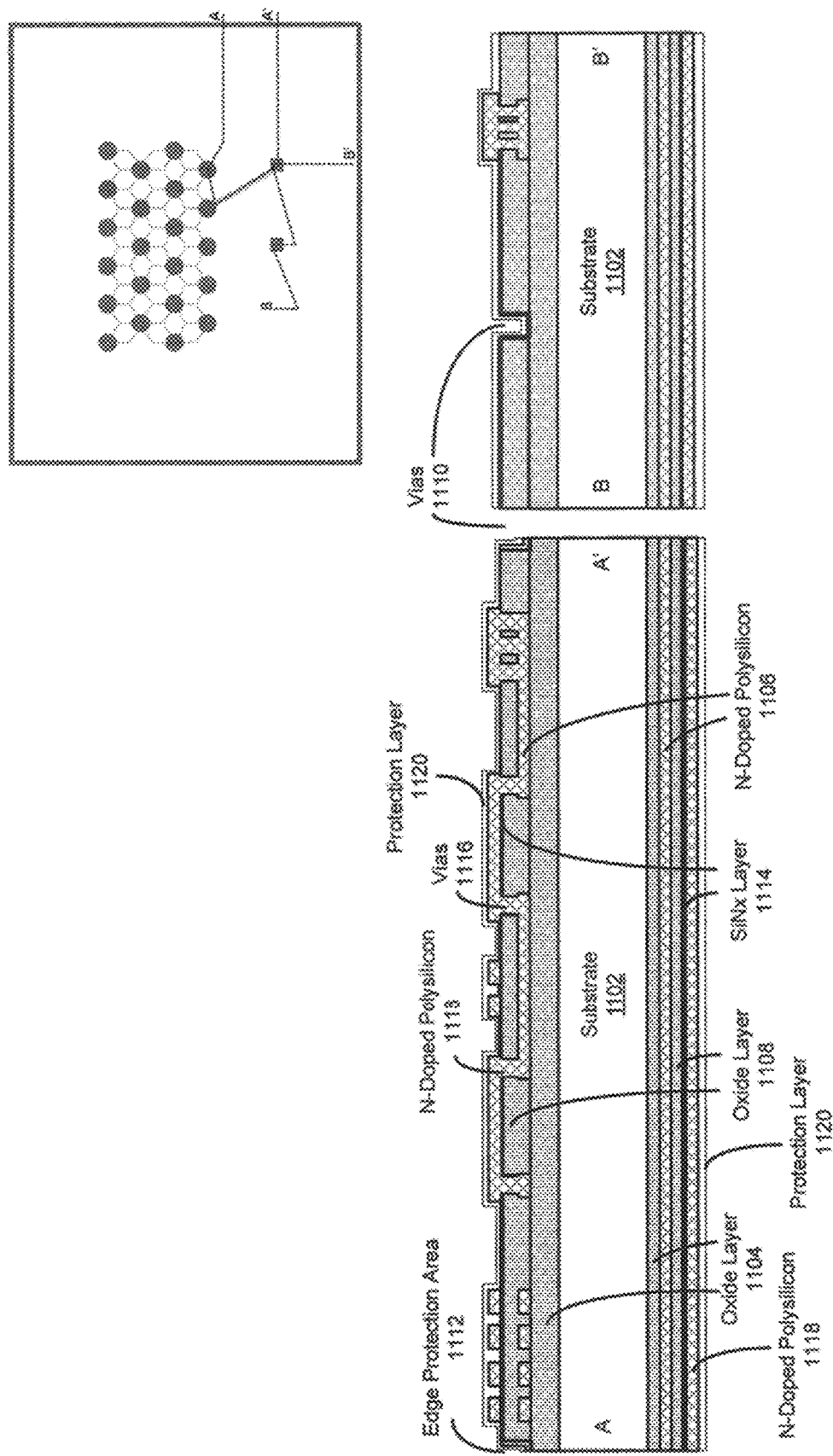
Figure 11J:
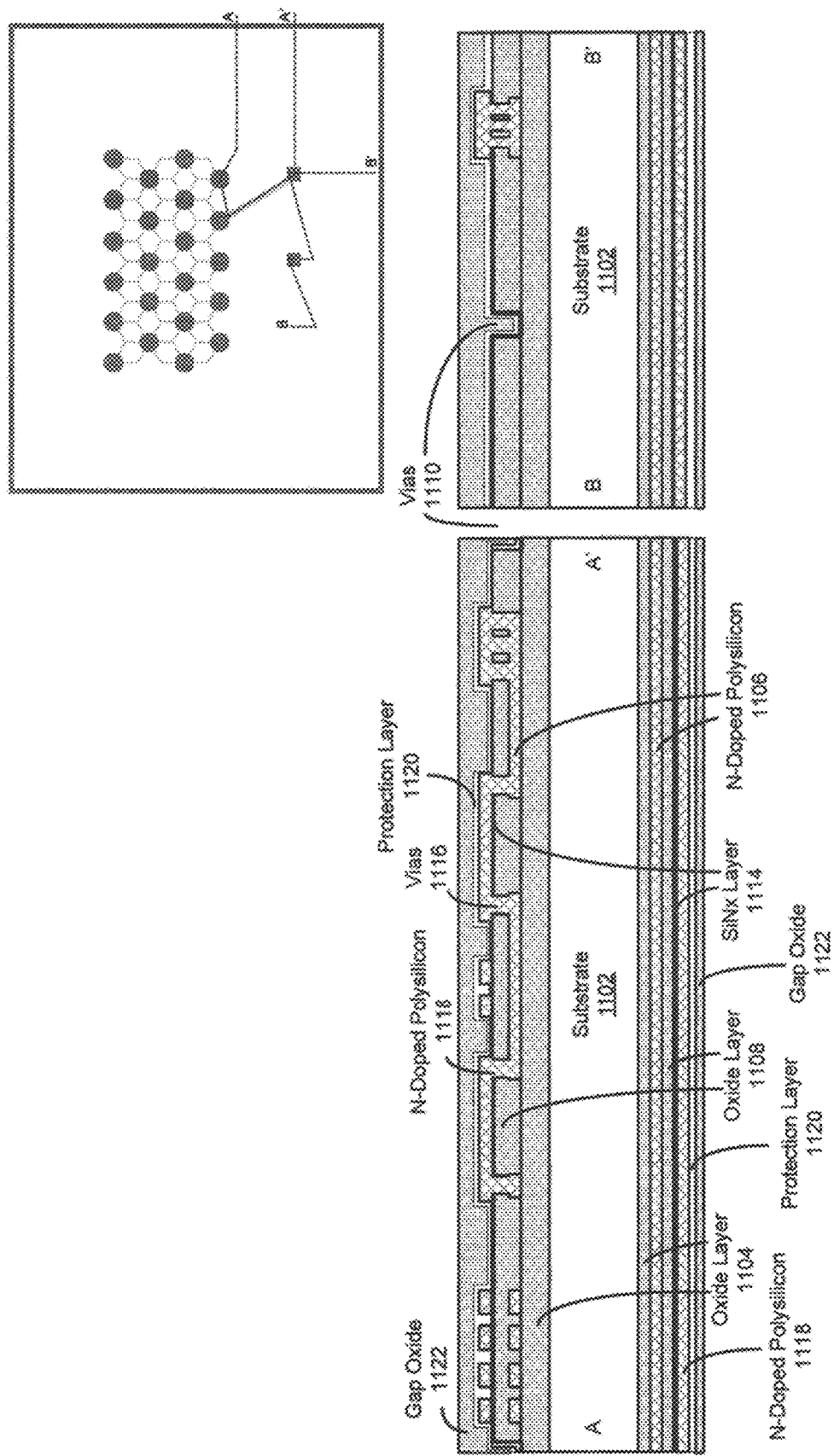
Figure 11K:
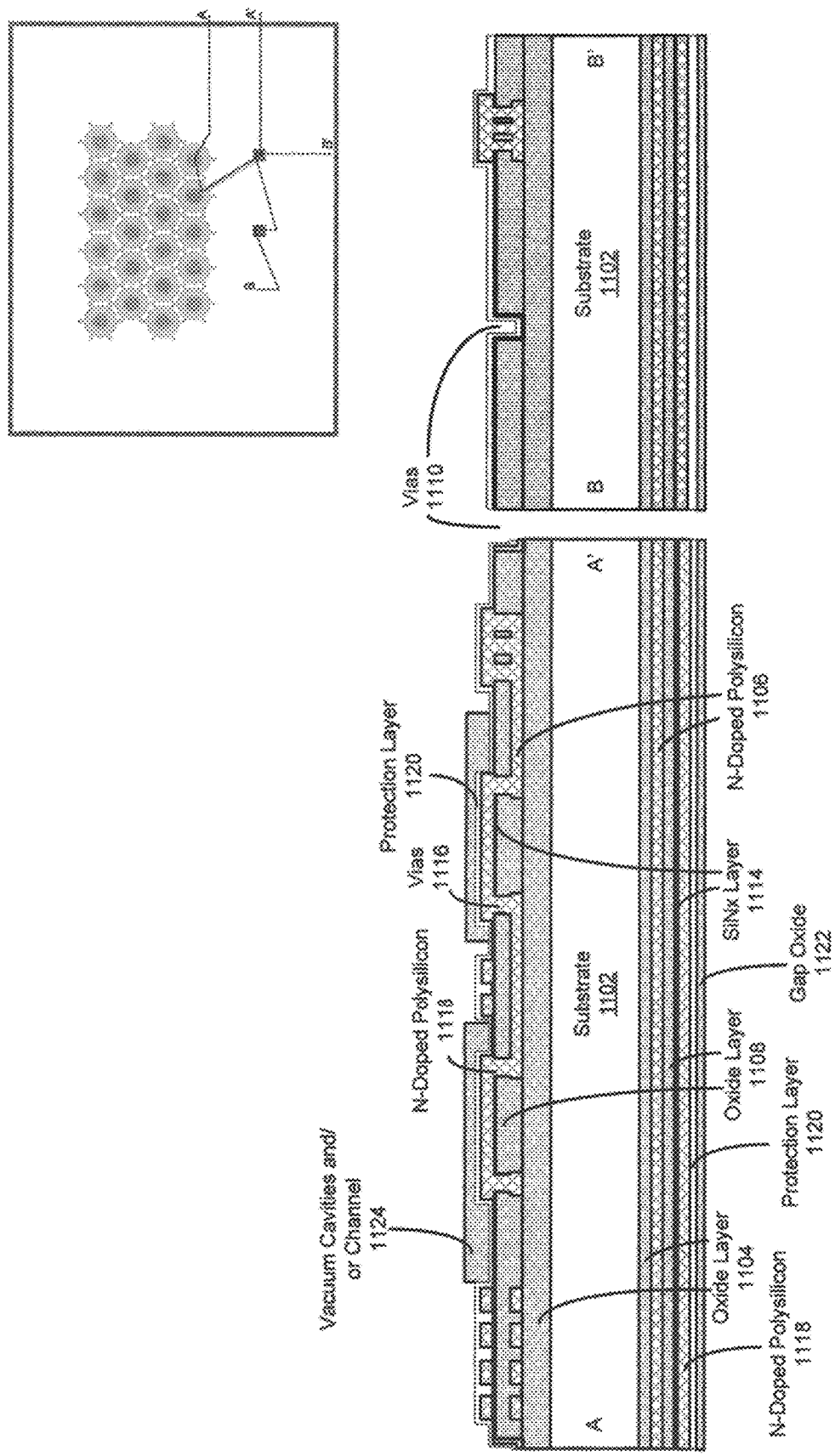
Figure 11L:
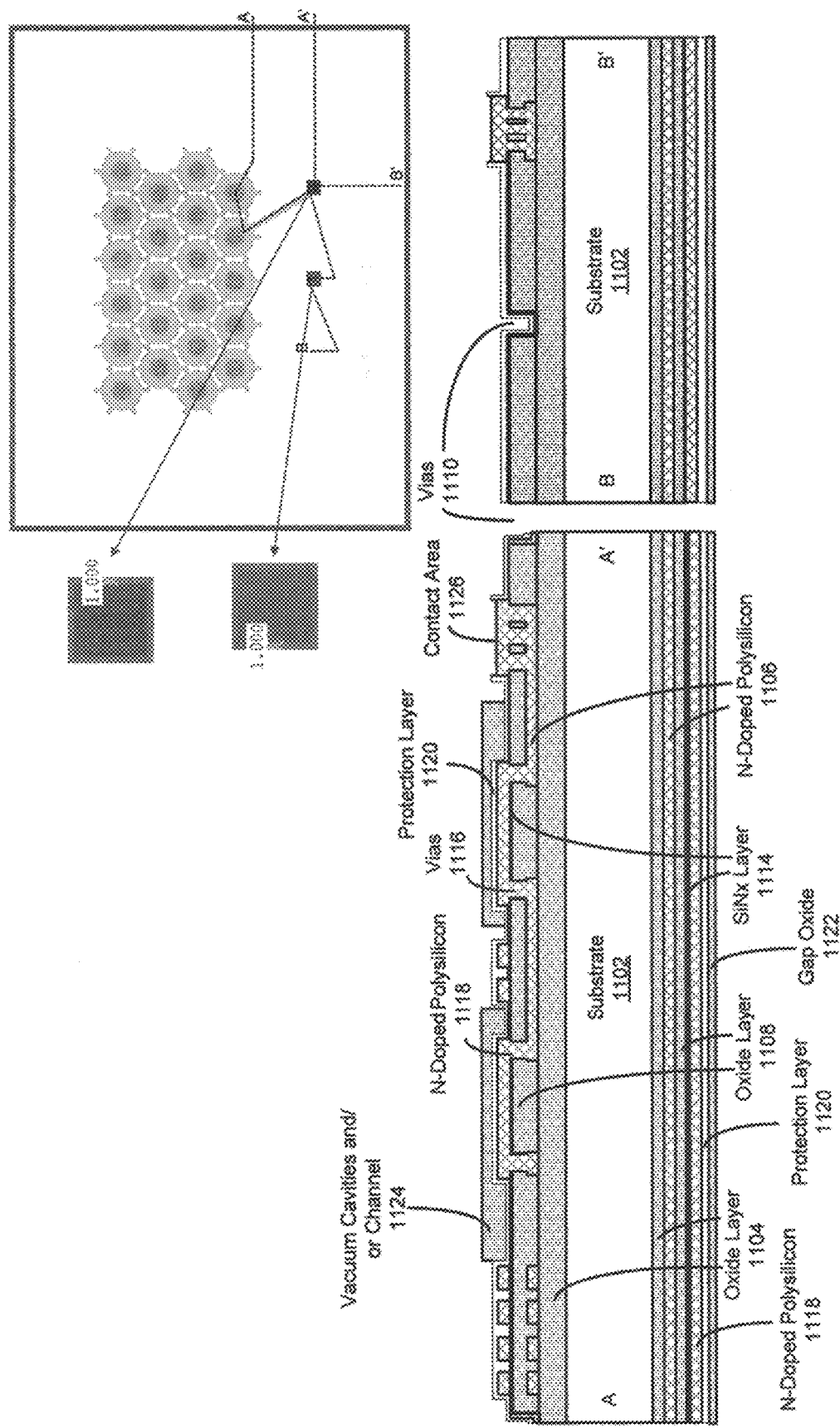
Figure 11M:
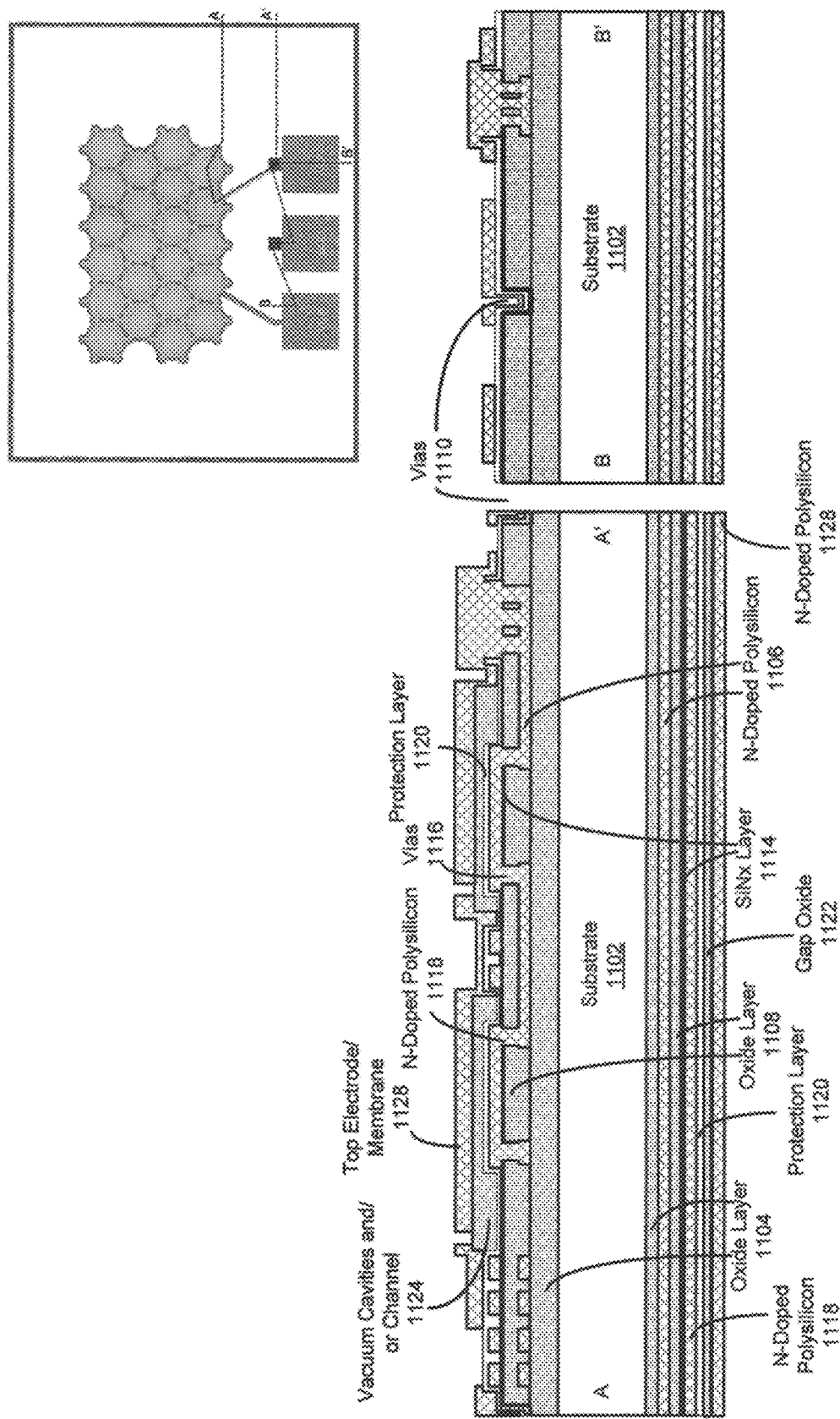
Figure 11N:
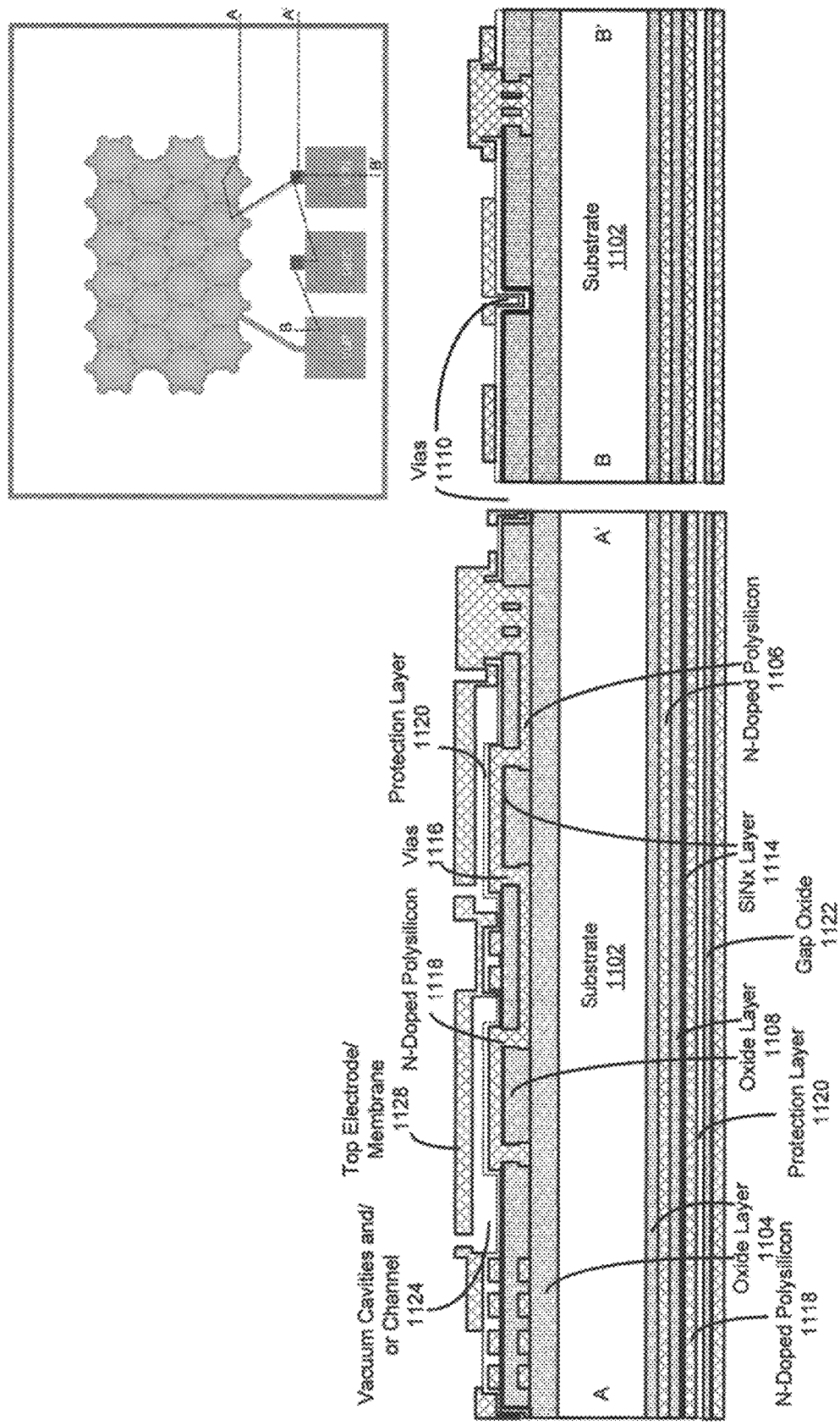
Figure 11O:
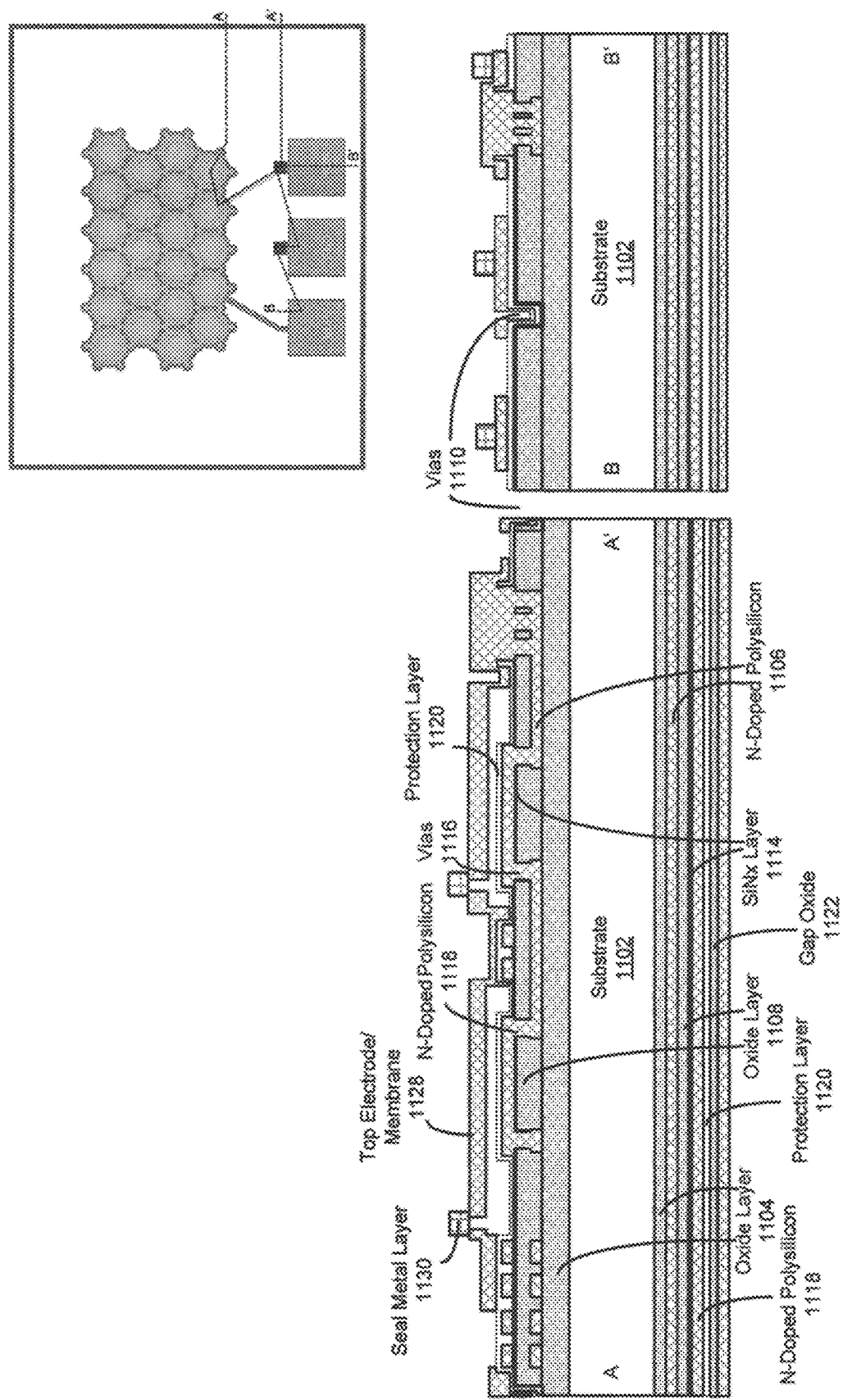
Figure 11P:
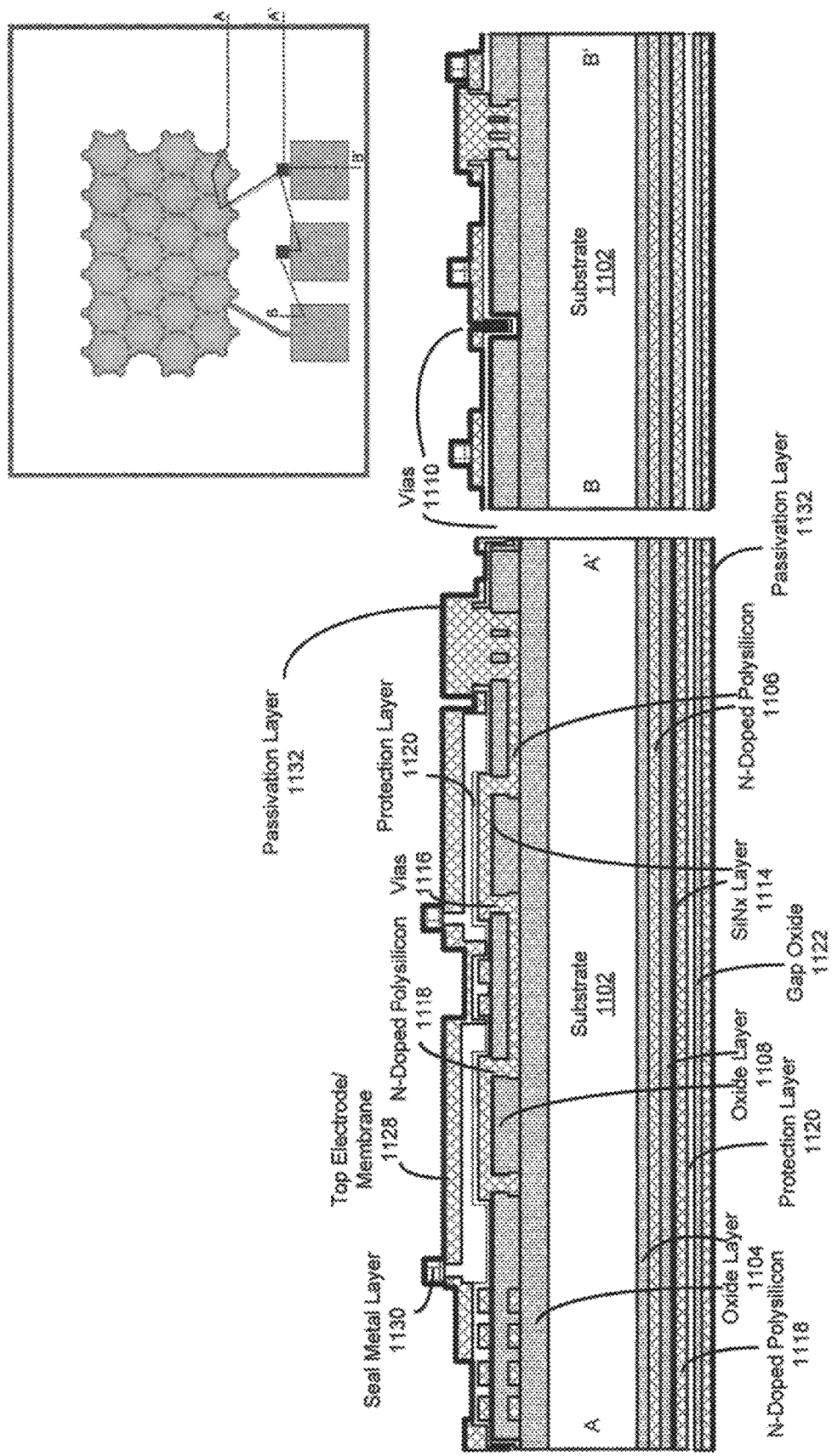
Figure 11Q:
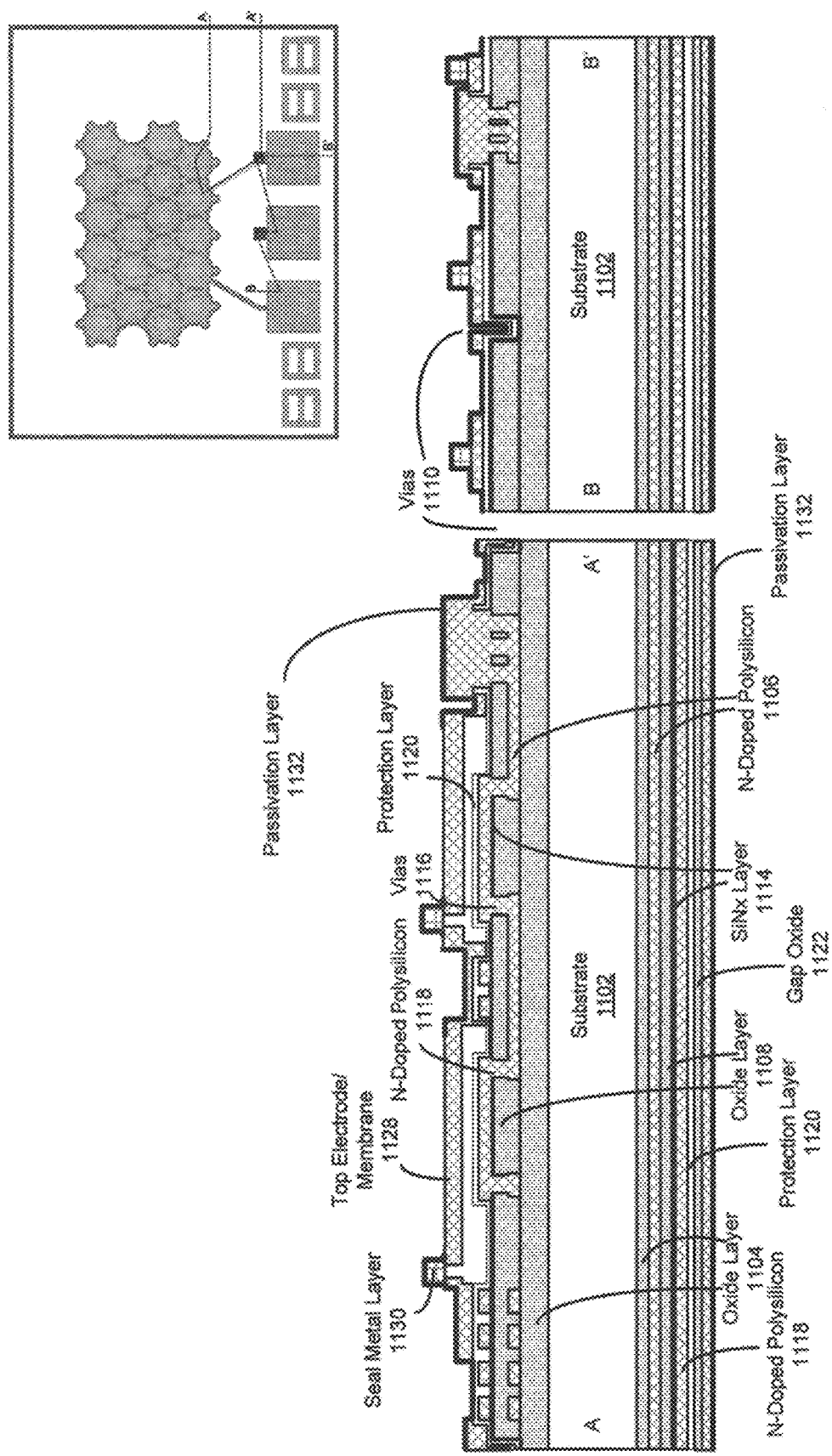
Figure 11R:
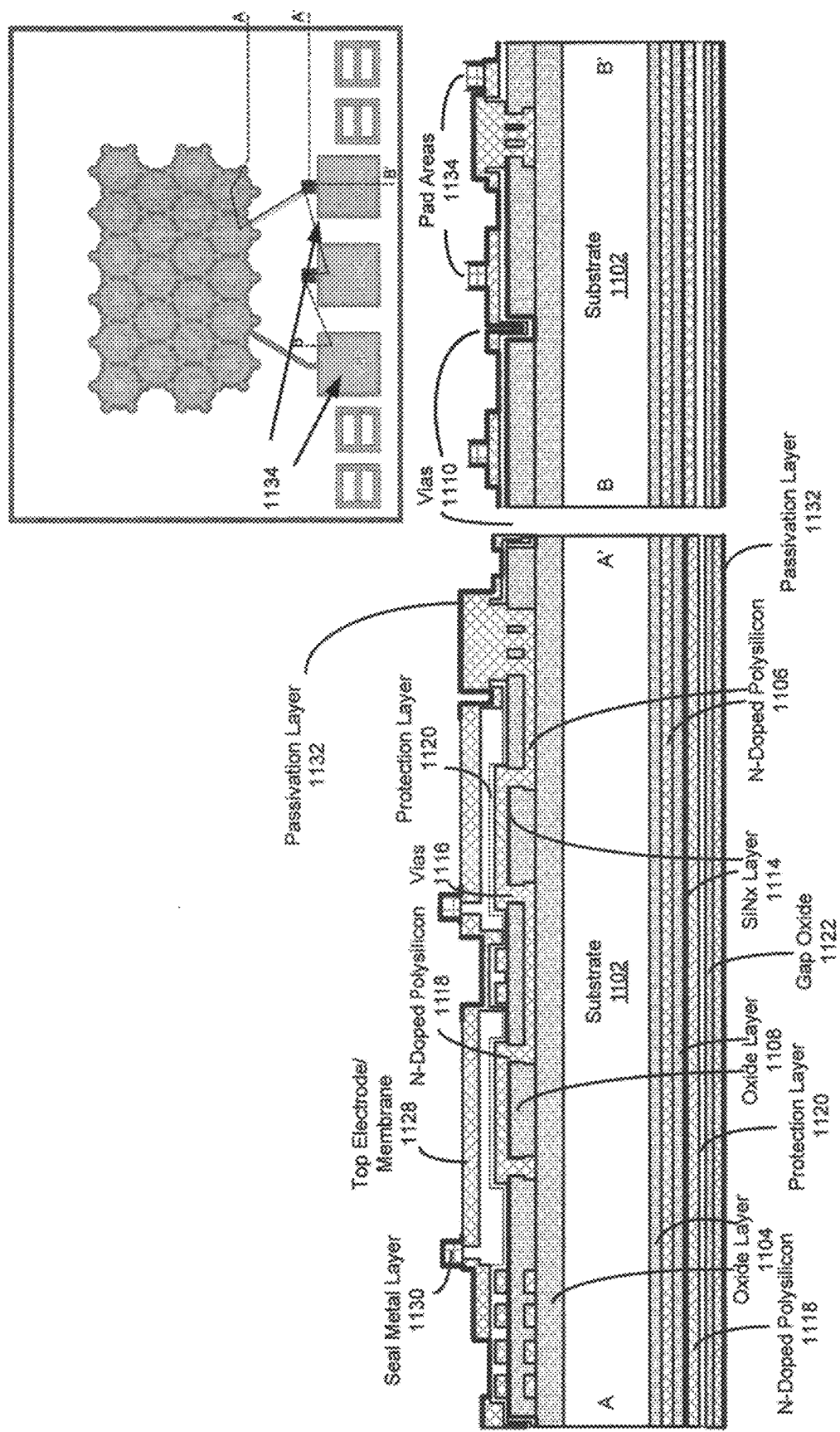

FIGS. 11A-11R illustrate an example of a detailed process for manufacturing the pressure sensor 100 depicted in FIG. 10. Referring now to FIG. 11A, a bulk n-type silicon (e.g., 1.5-3.0 Ω-cm) is used and cleaned as a substrate 1102 for the pressure sensor 100. It is appreciated that a mask may be used to create the alignment mark across A-A' and B-B' as shown by FIG. 11A. Referring now to FIG. 11B, the substrate 1102 is doped with, e.g., $POCl_3$, to become an N+ substrate and a first oxide layer 1104, e.g., $SiO_2$, is formed on the top and/or bottom surfaces of the substrate 1102 through thermal oxide deposition, e.g., 1 μm of oxide via wet etching. Here, the oxide layer 1104 may serve as an electrical isolation layer. In some embodiments, the isolation layer 1104 may also reduce parasitic capacitance of the pressure sensor 100. Referring now to FIG. 11C, a first n-doped polysilicon layer 1106 is deposited with certain thickness (e.g., 330 nm) on the top and/or bottom oxide layers 1104. The n-doped polysilicon layer 1106 may be used for routing of interconnects of the pressure sensor 100. It is appreciated that a mask be used and patterned to pattern the n-doped polysilicon layer 1106 on one side of the substrate 1102. Referring now to FIG. 11D, a second oxide layer 1108, e.g., $SiO_2$, is deposited on the patterned n-doped polysilicon layer 1106 and further on the exposed oxide layer 1104 as the second isolation layer via, e.g., plasma-enhanced chemical vapor deposition (PECVD), to have a certain distance, e.g., 1 μm, from the first oxide layer 1104.

Referring now to FIG. 11E, a substrate oxide area is defined using a mask to pattern oxide for defining polysilicon locations of vias 1110 to substrate 1102 and wafer edge protection area 1112 to prevent external gas to enter into the cavity of the pressure sensor 100. Once the oxide area is defined by the patterned mask, the vias 1110 and the edge protection area 1112 may be formed, e.g., etched. Referring now to FIG. 11F, a silicon nitride ($SiN_x$) layer 1114 is deposited on top of the second oxide layer 1108 with certain thickness (e.g., 250 nm). It is appreciated that the SiNx layer 1114 reduces undercut issue during VHF release and the nitride (e.g., LPCVD, 700-800 C) covering the substrate oxide area and preventing gas from entering into the cavities of the pressure sensor 100. It is appreciated that in some embodiments, the $SiN_x$ layer 1114 may also cover the edge protection area 1112 and/or the vias 1110.

Referring now to FIG. 11G, a plurality of vias 1116s is formed within the oxide layer 1108 to expose the n-doped polysilicon layer 1106. It is appreciated that a patterned mask may be used to form the vias. Referring now to FIG. 11H, an n-doped polysilicon layer 1118 is deposited and patterned, e.g., using one or more masks that are patterned. For example, the n-doped polysilicon layer 1118 may connect with the n-doped polysilicon layer 1106. Moreover, the n-dope polysilicon layer 1118 may be patterned and form over the oxide layer 1108. It is appreciated that the n-doped polysilicon layer 1118 may have a certain thickness (e.g., 330 nm) of polysilicon by high temperature annealing, e.g., at 1100 degree Celsius, before sealing to improve vacuum stability. It is appreciated that a mask may also be used to pattern the n-doped polysilicon layer 1118 for the bottom electrode as well as for the edge protection area.

Referring now to FIG. 11I, a protection layer 1120, e.g., $Al_2O_3$, is deposited on the n-doped polysilicon layer 1118 and exposed portions of the $SiN_x$ layer 1114 in order to protect the n-doped polysilicon layer 1118 during the release process. It is appreciated that the protection layer 1120 may include a layer of $SiN_x$ with certain thickness (e.g., 135 nm) and/or a layer of $Al_2O_3$. It is appreciated that the $SiN_x$ in the protection layer 1120 may be used to further prevent gas from entering into the cavities of the pressure sensor 100 while a layer of $Al_2O_3$ protects the underlying n-doped polysilicon layer 1118 is subsequent release process. It is appreciated that in some embodiments, the $Al_2O_3$ layer may not be deposited with the second $SiN_x$ layer. In one nonlimiting example, the $Al_2O_3$ layer deposited with the second SiNx layer 1120 may have a thickness in the range of 0.1 μm to protect the second n-doped polysilicon layer 1118 during the VHF release process.

Referring now to FIG. 11J, a gap oxide layer 1122 is deposited on the protection layer 1120 as a sacrificial layer for chemical mechanical planarization (CMP) reaching 0.25 um±10%. Referring now to FIG. 11K, the gap oxide layer 1122 is patterned, e.g., by patterning a mask, where the remaining gap oxide layer 1122 corresponds to the multiple vacuum cavities and/or channels 1124 that will later be formed. Referring now to FIG. 11L, a plurality of contact areas 1126 are created by etching the protection layer 1120 to expose the n-doped polysilicon layer 1118 corresponding to the bond pad underneath, thereby opening the voltage and ground pad passivation.

Referring now to FIG. 11M, top electrode/membrane layer 1128 is formed on top of the gap oxide 1122 (associated with the vacuum cavities and/or channel 1124). The top electrode/membrane layer 1128 is formed by depositing n-doped polysilicon with certain thickness (e.g., 0.6 μm) which may compensate for polysilicon loss during etching after annealing. A mask may be used to pattern the top electrode/membrane layer 1128, i.e., the sensing membrane. Referring now to FIG. 11N, the gap oxide layer 1122 (associated with the vacuum cavities and/or channel 1124) is etched away via VHF release etching through a baking process with, e.g., 400 degrees Celsius for 90 mins at furnace, wherein the protection layer 1120 comprising for example $Al_2O_3$ and/or SiNx layer protects the n-doped polysilicon layer 1118 during the VHF release process. As illustrated, the cavities are formed. Referring now to FIG. 11O, sputter seal metal layer (M1) 1130 is deposited on the top electrode 1128 to seal the cavities. It is appreciated that the seal metal layer 1130 may include TiN, AlCu, Ti, or any combination thereof. A mask may be used to pattern the sputter seal metal layer 1130.

Referring now to FIG. 11P, an optional passivation layer 1132, e.g., PECVD nitride, may be deposited on top of the top electrode 1128 with certain thickness (e.g., ~0.5 μm). Referring now to FIG. 11Q, certain part of the passivation layer 1132 is opened using a mask to expose the membrane 1128 for diaphragm, pads, etc., while further protecting other features, e.g., seal metal layer 1130, etc. It is appreciated that a mask may then be used to expose wafer level physical die identification (id). Referring now to FIG. 11R, the pad areas 1134s are opened as shown using photolithography and etching. It is appreciated that in some embodiments, the sensor may go through a baking process with, e.g., 300 degrees Celsius for 3 hours at furnace, in order to increase its stability, e.g., stress and residual gas. Overall, a total of 12 masks may be used for the manufacturing of the pressure sensor 100.

Figure 12:
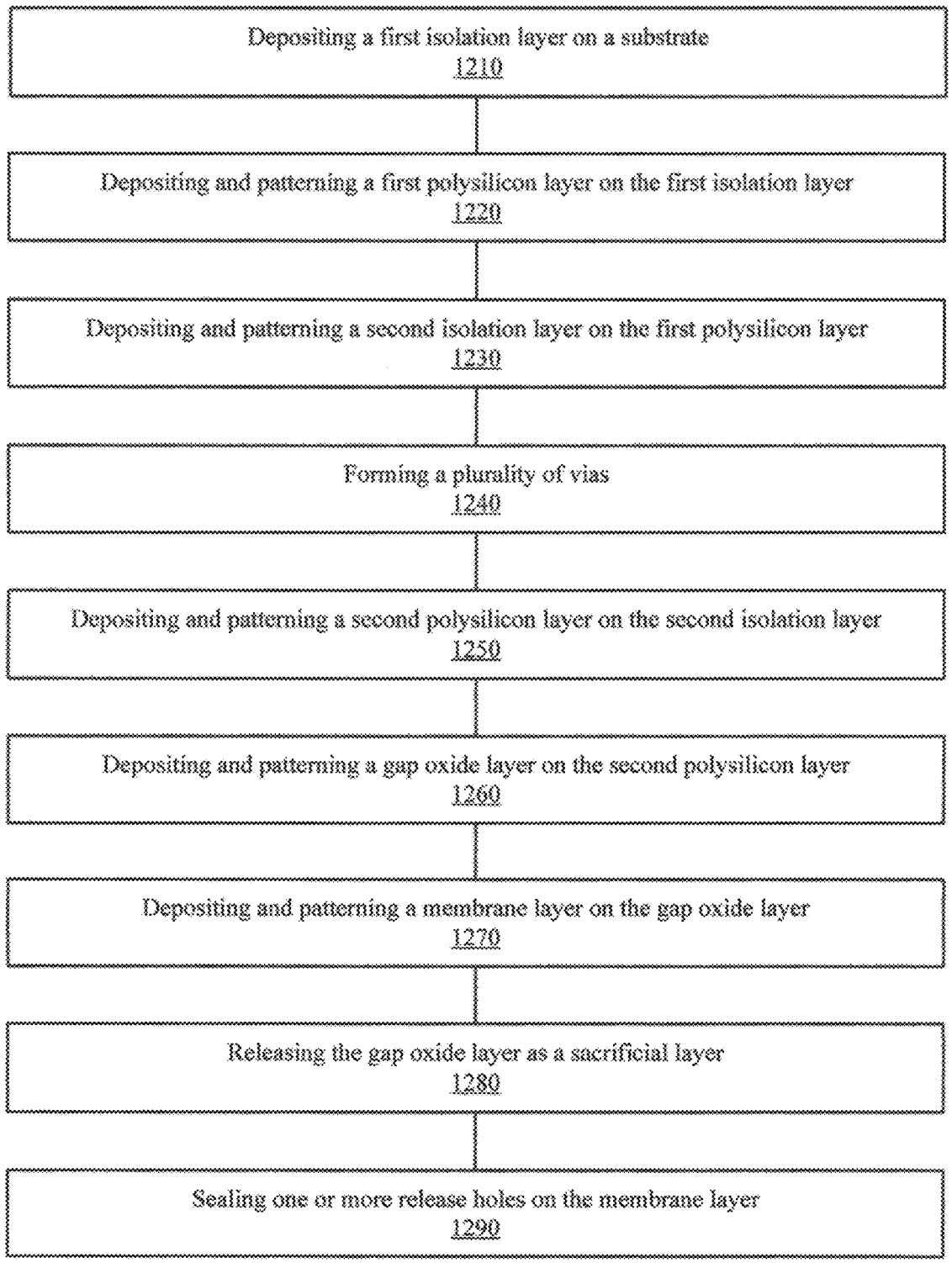
FIG. 12 shows a flow diagram of an example of a general process for manufacturing the pressure sensor according to one aspect of the present embodiments.

FIG. 12 shows a flow diagram of an example of a general process for manufacturing the pressure sensor 100 according to one aspect of the present embodiments. At step 1210, a first isolation layer is deposited on a substrate, as described above with respect to FIGS. 11A-11R. At step 1220, a first polysilicon layer is deposited on the first isolation layer and patterned, as described above with respect to FIGS. 11A-

11R. At step 1230, a second isolation layer is deposited on the first polysilicon layer and patterned, as described above with respect to FIGS. 11A-11R. At step 1240, a plurality of vias is formed, as described above with respect to FIGS. 11A-11R. At step 1250, a second polysilicon layer is deposited on the second isolation layer and patterned, as described above with respect to FIGS. 11A-11R. At step 1260, a gap oxide layer is deposited on the second polysilicon layer and patterned, as described above with respect to FIGS. 11A-11R. At step 1270, a membrane layer is deposited on the gap oxide layer and patterned, as described above with respect to FIGS. 11A-11R. At step 1280, the gap oxide layer is released as a sacrificial layer, as described above with respect to FIGS. 11A-11R. At step 1290, one or more release holes on the membrane layer is sealed, as described above with respect to FIGS. 11A-11R.

In some embodiments, an $Al_2O_3$ layer is deposited over the second polysilicon layer before depositing the gap oxide layer. In some embodiments, the second polysilicon layer is annealed before sealing to improve vacuum stability. According to some embodiments, a first SiNx layer is deposited on top of the second isolation layer and patterned. It is appreciated that in some embodiments a second $SiN_x$ layer is deposited on the second polysilicon layer and patterned. In some embodiments, $Al_2O_3$ is deposited on the second $SiN_x$ layer and patterned to protect the second polysilicon layer during the release process. In one nonlimiting example, a nitride layer is deposited on top of the membrane layer for passivation and patterned. In some embodiments, one or more openings are created on the nitride layer to expose the second $SiN_x$.

According to some embodiments, the one or more release holes on the membrane layer may be sealed with either a metal layer or a dielectric film. According to some embodiments, the one or more release holes are positioned at an edge of the membrane layer, inside a periphery of the membrane layer, or outside of a periphery of the membrane layer. The metal may be one or more of TiN, AlCu, and Ti. In some embodiments, the gap oxide is released through a vapor hydrofluoric acid (VHF) release process or through a BOE process. It is appreciated that the embodiments are described with respect to n-doped polysilicon for illustrative purposes. However, it is appreciated that a p-doped polysilicon may similarly be used and the description of the embodiments with respect to n-doped polysilicon should not be construed as limiting the scope of the embodiments.

It is appreciated that the polysilicon sensing membrane is therefore formed and is configured to deform responsive to a stimuli, e.g., pressure, and changes a capacitance between the polysilicon sensing membrane and the one or more polysilicon electrodes. Moreover, as described above a new pressure sensor design, e.g., sensing membrane and electrodes, with high environment stability is formed. Using polysilicon to form the sensing membrane, as well as electrode and routing, provides better TCO matching and higher thermal budget by using fewer metal layers, as an example. It is appreciated that in some embodiments, fewer metal layers, e.g., only one metal layer, are kept in the end of process for pad connection, thereby decreasing the amount of metal layer usage, as described above. Moreover, using polysilicon instead of metal for the electrode achieves higher annealing because polysilicon does not melt unlike metal. Use of polysilicon reduced hillock effect. In addition, polysilicon membrane is thin and small in size, thus providing better mechanical stability to prevent membrane stiction as well as reducing gravity sensitivity. In some embodiments, sensor performance is further improved by building a membrane array, as described above.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
depositing a first isolation layer on a substrate;
depositing and patterning a first polysilicon layer on the first isolation layer;
depositing and patterning a second isolation layer on the first polysilicon layer;
forming a plurality of vias;
depositing and patterning a second polysilicon layer on the second isolation layer;
depositing and patterning a gap oxide layer on the second polysilicon layer;
depositing and patterning a membrane layer on the gap oxide layer;
releasing the gap oxide layer as a sacrificial layer; and
sealing one or more release holes on the membrane layer.

2. The method of claim 1, wherein the one or more release holes on the membrane layer is sealed with either a metal layer or a dielectric film.

3. The method of claim 1 further comprising depositing an $Al_2O_3$ layer over the second polysilicon layer before depositing the gap oxide layer.

4. The method of claim 1, wherein the one or more release holes are positioned at an edge of the membrane layer.

5. The method of claim 1, wherein the one or more release holes are positioned inside a periphery of the membrane layer.

6. The method of claim 1, wherein the one or more release holes are positioned outside of a periphery of the membrane layer.

7. The method of claim 2, wherein the metal is one or more of TiN, AlCu, and Ti.

8. The method of claim 1, wherein the releasing the gap oxide is through a vapor hydrofluoric acid (VHF) release process.

9. The method of claim 1, wherein the releasing the gap oxide is through a buffered oxide etchant (BOE) release.

10. The method of claim 1 further comprising:
annealing the second polysilicon layer before sealing to improve vacuum stability.

11. The method of claim 1 further comprising:
depositing and patterning a first silicon nitride (SiNx) layer on top of the second isolation layer.

12. The method of claim 11 further comprising:
depositing and patterning a second $SiN_x$ layer on the second polysilicon layer.

13. The method of claim 12 further comprising:
depositing and patterning $Al_2O_3$ on the second $SiN_x$ layer to protect the second polysilicon layer during the release process.

14. The method of claim 13 further comprising:
depositing and patterning a nitride layer on top of the membrane layer for passivation.

15. The method of claim 14 further comprising:
creating one or more openings on the nitride layer to expose the second $SiN_x$.

* * * * *